United States Patent
Kashiwagi

(10) Patent No.: US 11,635,562 B2
(45) Date of Patent: Apr. 25, 2023

(54) IMAGE SOURCE UNIT, AND LIQUID CRYSTAL DISPLAY DEVICE

(71) Applicant: DAI NIPPON PRINTING CO., LTD., Tokyo-to (JP)

(72) Inventor: Tsuyoshi Kashiwagi, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/680,777

(22) Filed: Nov. 12, 2019

(65) Prior Publication Data

US 2020/0081177 A1 Mar. 12, 2020

Related U.S. Application Data

(63) Continuation-in-part of application No. 15/812,549, filed on Nov. 14, 2017, now abandoned, which is a
(Continued)

(30) Foreign Application Priority Data

Feb. 16, 2015 (JP) .................. 2015-027857
Feb. 18, 2015 (JP) .................. 2015-029903

(51) Int. Cl.
*F21V 8/00* (2006.01)
*G02F 1/1335* (2006.01)

(52) U.S. Cl.
CPC ......... *G02B 6/0051* (2013.01); *G02B 6/0056* (2013.01); *G02B 6/0045* (2013.01); *G02F 1/133607* (2021.01)

(58) Field of Classification Search
CPC ....... G02B 6/005; G02B 6/0056; G02B 5/003
See application file for complete search history.

(56) References Cited

U.S. PATENT DOCUMENTS 7,474,463 B2 * 1/2009 Katsura .................. G02B 5/021
359/455
2006/0103779 A1 * 5/2006 Amemiya ......... G02F 1/133524
349/95
(Continued)

FOREIGN PATENT DOCUMENTS

JP 9-169613 6/1997
JP 9-255516 9/1997
(Continued)

OTHER PUBLICATIONS

Notice of Allowance, U.S. Appl. No. 15/041,893, dated Jul. 18, 2019 (10 pages).
(Continued)

*Primary Examiner* — Jonathan Y Jung
(74) *Attorney, Agent, or Firm* — Hamre, Schumann, Mueller & Larson, P.C.

(57) ABSTRACT

An image source unit includes: a surface light source device including a reflective polarizing plate; a liquid crystal panel; and an optical sheet that is arranged between the surface light source device and the liquid crystal panel, the optical sheet including: an optical function layer that is laminated to one surface of a substrate layer; and a light diffuser layer that is arranged on one surface of the optical function layer, the one surface being on an opposite side of another surface of the optical function layer where the substrate layer is arranged across the optical function layer, the optical function layer including: light transmission parts that extend in a horizontal direction, and are arranged in a plurality of rows at predetermined intervals in a vertical direction; and light absorption parts that are formed between adjacent light transmission parts, and have a lower refractive index than that of the light transmission parts, wherein an angle formed by interfaces on upper sides of the light absorption parts and a normal line of a surface of the optical sheet is narrower (Continued)

than that formed by the interfaces on lower sides of the light absorption parts and the normal line of the surface of the optical sheet.

5 Claims, 24 Drawing Sheets

Related U.S. Application Data continuation-in-part of application No. 15/041,893, filed on Feb. 11, 2016, now abandoned.

(56) References Cited

U.S. PATENT DOCUMENTS

| | | | |
|---|---|---|---|
| 2006/0245060 A1* | 11/2006 | Goto | G02B 5/003 |
| | | | 359/613 |
| 2007/0153377 A1 | 7/2007 | Goto | |
| 2009/0033222 A1 | 2/2009 | Park et al. | |
| 2009/0091919 A1* | 4/2009 | Goto | G02F 1/133606 |
| | | | 362/97.1 |
| 2010/0271721 A1 | 10/2010 | Gaides et al. | |
| 2011/0122493 A1* | 5/2011 | Ogawa | G02B 1/14 |
| | | | 264/1.36 |
| 2011/0170194 A1 | 7/2011 | Kashiwagi | |
| 2013/0039031 A1* | 2/2013 | Asano | G02B 5/0242 |
| | | | 362/19 |
| 2014/0204464 A1* | 7/2014 | Halverson | G02F 1/133524 |
| | | | 359/599 |

FOREIGN PATENT DOCUMENTS

| | | |
|---|---|---|
| JP | 2006-171700 | 6/2006 |
| JP | 2009-058660 | 3/2009 |
| JP | 2010-217871 | 9/2010 |
| JP | 2011-508262 | 3/2011 |
| JP | 2012-150492 | 8/2012 |
| JP | 2012-530938 | 12/2012 |
| JP | 2014-063106 | 4/2014 |
| WO | 2010/148082 | 12/2010 |

OTHER PUBLICATIONS

Notice of Allowance, U.S. Appl. No. 15/041,893, dated Feb. 10, 2020 (11 pages).

Office Action, U.S. Appl. No. 15/041,893, dated Jun. 12, 2020 (18 pages).

Advisory Action, U.S. Appl. No. 15/812,549, dated Feb. 10, 2020 (4 pages).

Office Action, U.S. Appl. No. 15/812,549, dated May 15, 2020 (16 pages).

Office Action, U.S. Appl. No. 16/522,431, dated Apr. 29, 2020 (14 pages).

Office Action, U.S. Appl. No. 16/656,017, dated Apr. 29, 2020 (12 pages).

Notice of Allowance, U.S. Appl. No. 16/522,431, dated Dec. 6, 2021 (18 pages).

Final Office Action, U.S. Appl. No. 15/041,893, dated Jan. 14, 2021 (21 pages).

Final Office Action, U.S. Appl. No. 15/812,549, dated Dec. 30, 2020 (16 pages).

Final Office Action, U.S. Appl. No. 16/522,431, dated Dec. 16, 2020 (18 pages).

Final Office Action, U.S. Appl. No. 16/656,017, dated Dec. 16, 2020 (17 pages).

* cited by examiner

IMAGE SOURCE UNIT, AND LIQUID CRYSTAL DISPLAY DEVICE

TECHNICAL FIELD

The present invention relates to image source units including optical sheets, and liquid crystal display devices.

BACKGROUND ART

A liquid crystal display device of a car navigation system, a liquid crystal television, etc. includes a light source, and an optical sheet constituted of a plurality of layers which have various functions for improving ag the quality of light emitted from the light source to offer the light to an observer.

For example, WO 2010/148082 and JP 2010-217871 A disclose such optical sheets.

The optical sheet (light control film) of WO 2010/148082 has transmissive regions that are arranged in a row along a sheet surface so as to be light-transmissive, and absorptive regions that are arranged in a row, each of which is between transmissive regions, so as to be light-absorptive. It is disclosed that a width at the narrowest region of a transmissive region and pitch of transmissive regions have a certain relationship.

The optical sheet of JP 2010-217871 A includes an optical functional sheet layer that has prisms arranged in a row along a sheet surface so as to be light-transmissive, and light absorption parts arranged in a row, each of which is between prisms, so as to be light-absorptive. Thereby, an image light and outside light are reflected and absorbed, to improve the quality of the image light.

SUMMARY OF INVENTION

Technical Problem

Having such a light absorption part (absorptive region) makes it possible to absorb light that causes something bad, at the light absorption part to have a proper light blocking effect. "Light blocking effect" means magnitude of performance in light control in a desired direction. A high light blocking effect makes it possible to control light not to be emitted in a predetermined direction.

Here, the main observer of a liquid crystal display device of an in-vehicle navigation system, etc. is a driver. Thus, visibility from a diagonally upward viewpoint (in a driver's view) is important. On the other hand, light is emitted even in a direction where light is not necessary to be emitted, from a liquid crystal display device having a conventional optical sheet as disclosed in Patent Literatures 1, 2, etc. Therefore, using a conventional optical sheet restricts light emitted at such a viewing angle that a driver can visually recognize light, which leads to poor visibility in a driver's view, and low efficiency of light utilization.

In view of the above problems, an object of the present invention is to provide an image source unit including an optical sheet that can improve visibility at a desired position, and can keep high efficiency of light utilization. The present invention also provides an image display device that includes the image source unit.

Solution to Problem

One aspect of the present invention is an image source unit comprising: a surface light source device that includes a light source, and a reflective polarizing plate; a liquid crystal panel that is arranged on a light output side of the surface light source device; and an optical sheet that is arranged between the surface light source device and the liquid crystal panel, the optical sheet comprising: a substrate layer, an optical function layer that is laminated to one surface of the substrate layer, and a light diffuser layer that is arranged on one surface of the optical function layer, the one surface being on an opposite side of another surface of the optical function layer where the substrate layer is arranged across the optical function layer, the optical function layer comprising: light transmission parts that have predetermined cross sections, extend in a horizontal direction, and are arranged in a plurality of rows at predetermined intervals in a vertical direction; and light absorption parts that are formed between adjacent light transmission parts, and have a lower refractive index than that of the light transmission parts, wherein an angle formed by interfaces on upper sides of the light absorption parts and a normal line of a surface of the optical sheet is narrower than that formed by the interfaces on lower sides of the light absorption parts and the normal line of the surface of the optical sheet, the interfaces being between the light transmission parts and the light absorption parts.

In the image source unit, a viewing angle of light on an upper side may be wider than that on a lower side, a relative brightness ratio of light emitted to a laminate of a reference diffuser plate and the reflective polarizing plate at 20° upward in the vertical direction and 0° in the horizontal direction may be no less than 35%, and a relative brightness ratio of light emitted to the laminate of the reference diffuser plate and the reflective polarizing plate at 40° in the horizontal direction and 0° in the vertical direction may be no less than 35%.

An image display device comprising: a housing; and the image source unit which is arranged inside the housing may be also provided.

Advantageous Effects of Invention

According to the present invention, visibility at a desired position, for example, in a driver's view can be improved, and high efficiency of light utilization can be kept.

DESCRIPTION OF EMBODIMENTS

Figure 1:
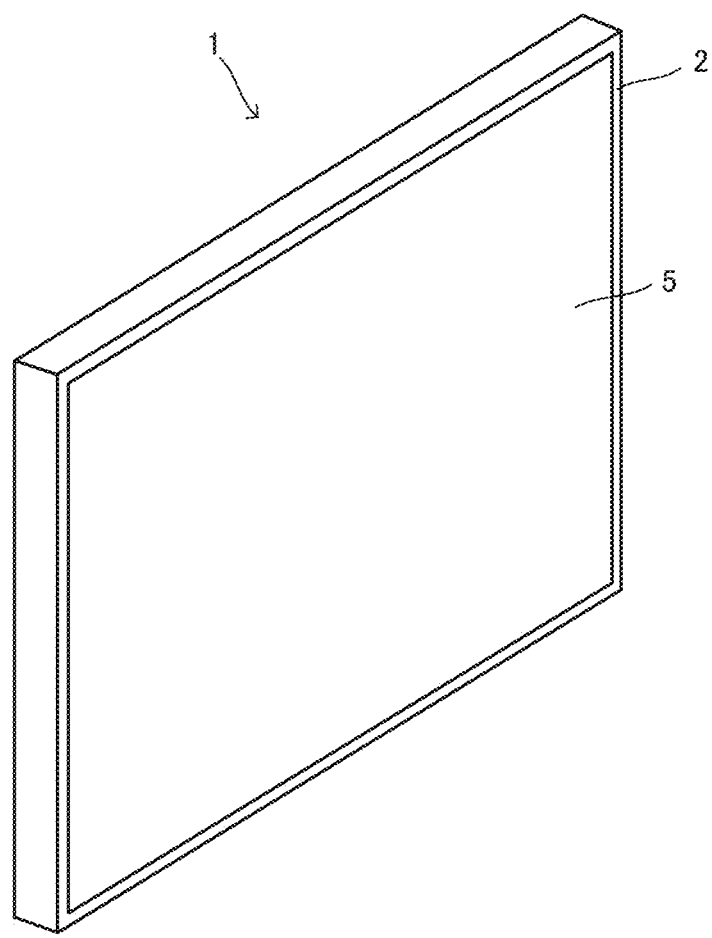
FIG. 1 is an external perspective view of an image display device 1.

Hereinafter the present invention will be described with reference to the embodiments shown in the drawings. The present invention is not limited to these embodiments. Because most of elements included in the present invention are actually very minute or very thin layers, parts of the elements are varied, enlarged, etc. to be shown in the drawings for understandability. While signs are appended to the elements, parts of signs which are repeated are sometimes omitted for visibility.

FIG. 1 is an explanatory view of a first embodiment, and is a perspective view showing an image display device 1 including an image source unit 5. The right of the page of FIG. 1 is an observer side. Here, the image display device 1 of this embodiment is an image display device for the use in cars, and examples thereof include a car navigation device. The image display device 1 includes a housing 2. The image source unit 5 is built in inside the housing 2.

The housing 2 forms an outer shell of the image display device 1. The housing 2 is a member that houses thereinside almost all the members constituting the image display device. The housing 2 has an opening. A so-called screen portion of the image source unit 5 is exposed through the opening, which makes it possible to be visually recognized. The image display device 1 includes other various known components for functioning as an image display device.

Figure 2:
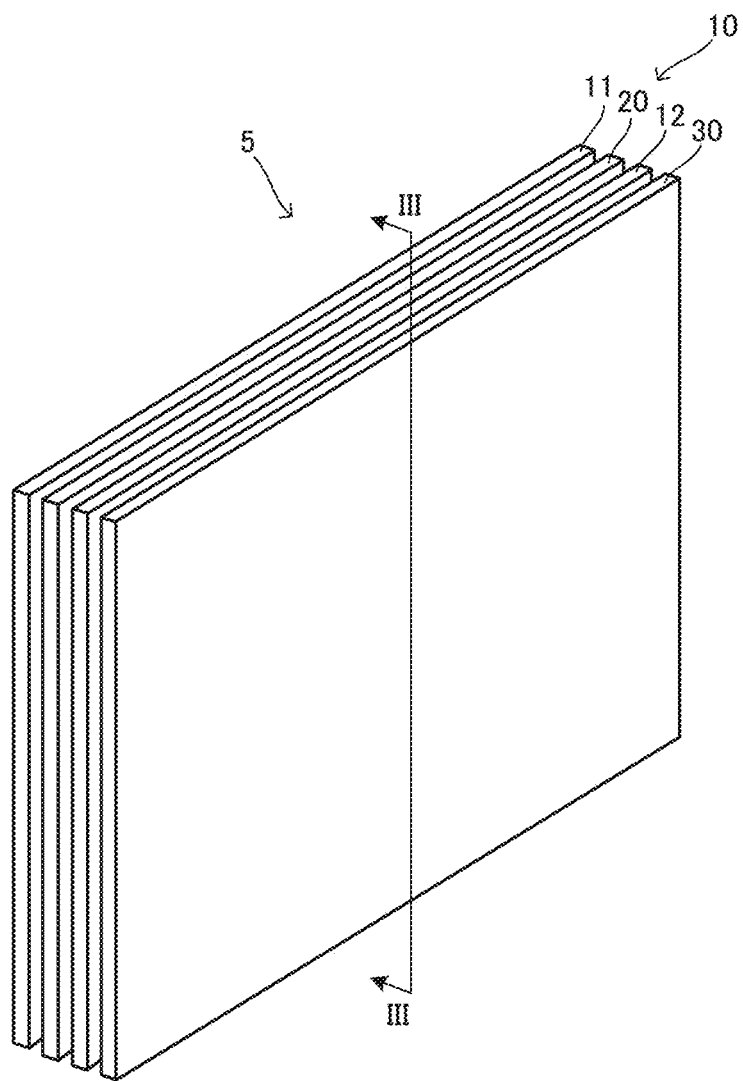
FIG. 2 is an exploded perspective view of an image source unit 5.
Figure 3:
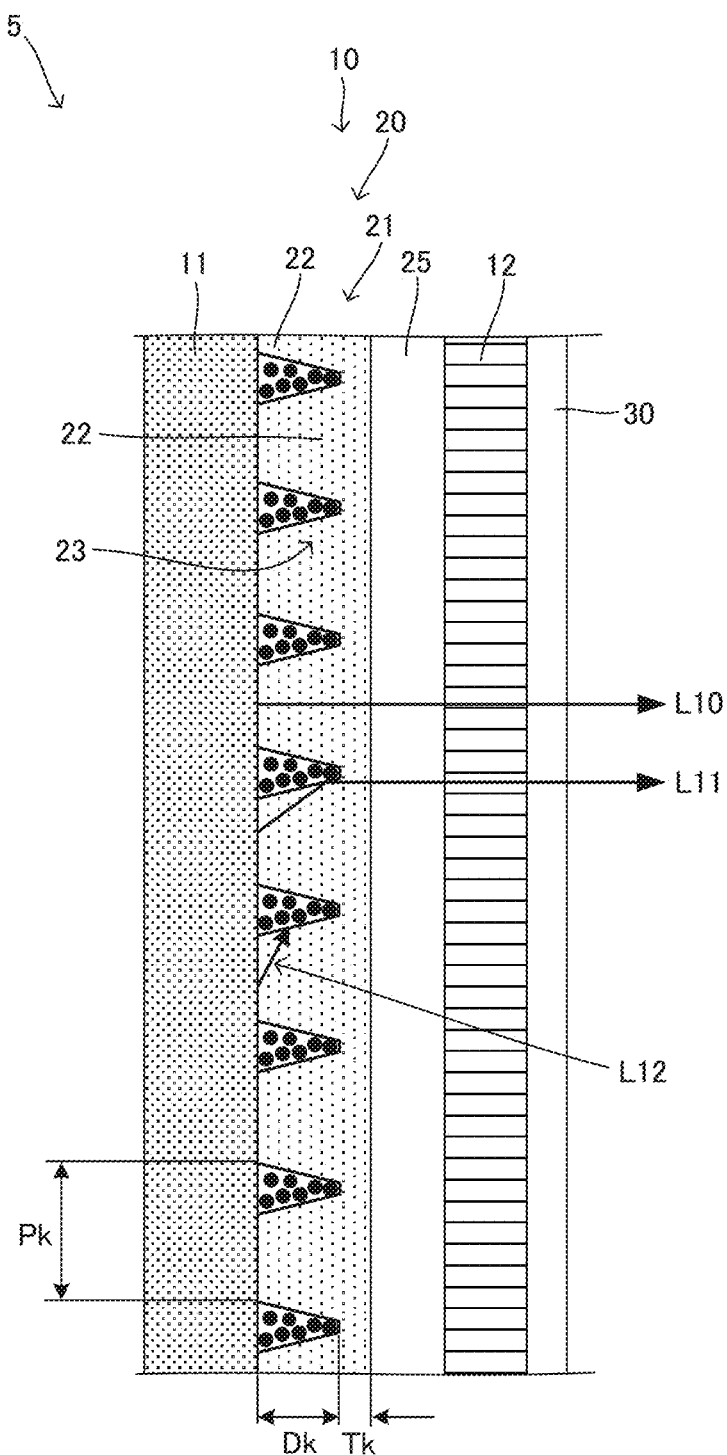
FIG. 3 is a cross-sectional view to explain the layer structure of the image source unit 5.

FIG. 2 is an exploded perspective view of the image source unit 5. FIG. 2 separately shows part of the layers that constitute the image source unit for understandability. Actually, the layers directly overlie each other or the like, to be layered (see FIG. 3). FIG. 3 is a cross-sectional view in a thickness direction, including the line shown by III-III in FIG. 2 (the line in a vertical direction). When the image source unit 5 is disposed in the image display device 1, the right of the sheet of each of FIGS. 2 and 3 is an observer side, and the left thereof is a light source side.

The image source unit 5 is composed of an image source 10 and a function layer 30 that is arranged in an image emission side of the image source 10 (that is, in the observer side).

This embodiment is structured to include a liquid crystal panel 12 in the image source 10. Specifically, the image source 10 includes a surface light source device 11, an optical sheet 20 and the liquid crystal panel 12. That is, in this embodiment, the optical sheet 20 is arranged between the surface light source device 11 and the liquid crystal panel 12.

Here, the surface light source device 11 and the liquid crystal panel 12 of known structures can be used.

Examples of the surface light source device 11 include a surface light source device composed of a reflection sheet, a light guide plate (a light emission source is arranged in its side surface), a diffusion sheet, a lens (prism) sheet and a reflective polarizing sheet, which are layered ii this order from the light source side (the left of the page of FIG. 3) to the observer side (the right thereof).

Examples of the liquid crystal panel 12 include a liquid crystal panel composed of a polarizing film, a glass substrate, a liquid crystal layer, a glass substrate and a polarizing film, which are layered in this order from the light source side (the left of the page of FIG. 3) to the observer side (the right thereof).

In this embodiment, the optical sheet 20 consists of a plurality of layers, and is arranged between the surface light source device 11 and the liquid crystal panel 12 in a light emission side of the surface light source device 11. In this embodiment, the optical sheet 20 includes an optical function layer 21 and a substrate layer 25, which are arranged in this order from the side of the surface light source device 11. Each of the layers will be described below. For convenience, the substrate layer 25 will be described first, and after that, the optical function layer 21 will be described.

The substrate layer 25 is a layer that is a substrate for forming the optical function layer 21 on one surface thereof. The substrate layer 25, having translucency, supports the optical function layer 21 so as to prevent the optical function layer 21 from deforming. In view of this, concrete examples of materials that constitute the substrate layer 25 include transparent resin mainly constituted of an acrylic resin, styrene, polycarbonate, polyethylene terephthalate (PET), acrylonitrile and/or triacetyl cellulose (TAC), and epoxy acrylate and urethane acrylate based reactive resin (such as ionizing radiation curable type resin).

Among them, it is preferable to use TAC, a methacrylate resin and/or polycarbonate, which bring(s) low birefringence, in view of the combination with the liquid crystal panel. Further, it is desirable to use polycarbonate which has a high glass transition temperature, for an in-vehicle use and so on requiring a high heat resisting property. Specifically, the glass transition temperature of polycarbonate is 143'C. Polycarbonate is suitable for an in-vehicle use that generally requires durability at 105° C.

Non-limiting thickness of the substrate layer 25 is preferably 25 μm to 300 μm. There is a risk that some problem occurs in processability in a case where thickness of the substrate layer 25 is out of the above range. For example, creases tend to be generated on the substrate layer 25 thinner than 25 μm. If the substrate layer 25 is thicker than 300 μm, it gets difficult to roll up the optical sheet 20.

A surface of the substrate layer 25 which is not in touch with the optical function layer 21 may be a rough surface. In a case where a rough surface is formed, its surface roughness is preferably 0.1 μm to 0.2 μm in Ra (μm) (JIS B 0601(2001) arithmetical mean roughness). The surface roughness within the above range makes it possible to hold down: generation of interference fringes due to so-called optical contact when the optical sheet 20 touches other layers; and generation of something bad in the exterior view such as scintillation (so-called glare on the screen), which originates from people's easy recognition of unevenness based on the roughness.

Figure 4:
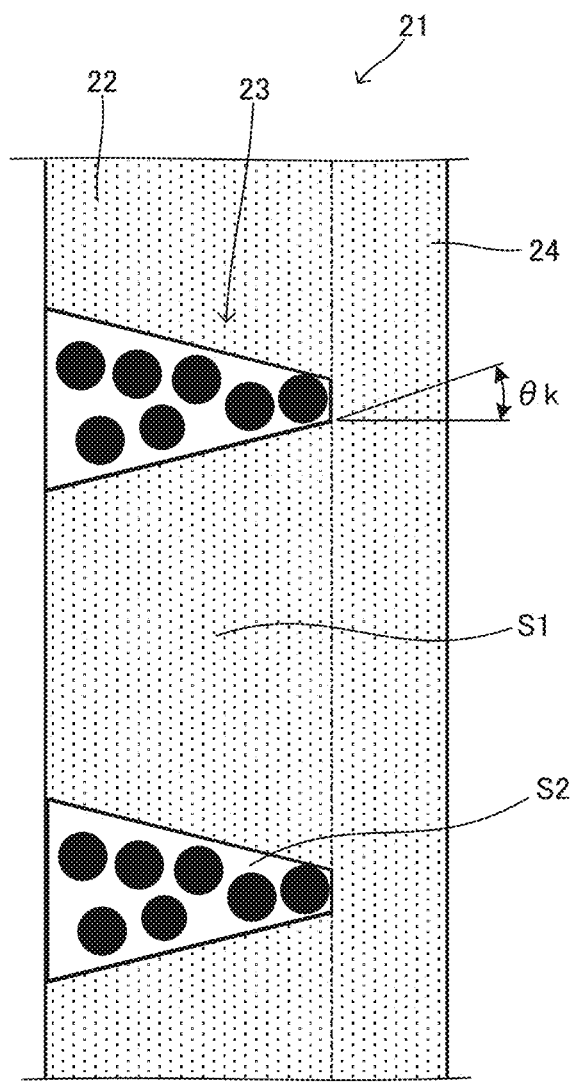
FIG. 4 is an enlarged view focusing on an optical function layer 21.

In this embodiment, the optical function layer 21 has a function of changing a direction of an image light to the front direction, and absorbing part of an image light that is emitted from the image source 10, so that the image light is not reflected in a windshield of a car. That is, the optical function layer 21 is a layer having a light blocking effect of controlling a direction where light travels. FIG. 4 shows a partially enlarged view of FIG. 3, focusing on the optical function layer 21.

In this embodiment, the optical function layer 21 has a cross section shown in FIGS. 3 and 4, and has a shape extending in a direction into and out of the page. In this embodiment, this extending direction is a horizontal direction in a state where the image display device 1 is installed in a car. This prevents an image light from being reflected in a windshield as described below.

The optical function layer 21 includes light transmission parts 22, which are trapezoids on the cross section appearing in FIGS. 3 and 4, and light absorption parts 23 having cross sections of trapezoids, each of which is formed between two adjacent light transmission parts 22. Thus, in this embodiment, the light transmission parts 22 and the light absorption parts 23 are arranged in a row alternately in a vertical direction in a state where the image display device 1 is installed in a car.

A light transmission part 22 is a portion whose main function is to transmit light. In this embodiment, the light transmission part 22 is an isosceles trapezoid having a longer lower base in the substrate layer 25 side (observer side) and a shorter upper base in the opposite side (surface light source device 11 side), in the cross section appearing in FIGS. 3 and 4. The light transmission part 22 extends in the above described direction along a surface of the substrate layer 25 while keeping the cross section, and light transmission parts 22 are aligned at intervals in a direction different from this extending direction. A space of a trapezoidal cross section is formed between adjacent light transmission parts 22. Thus, this space has the trapezoidal cross section of a longer lower base in the upper base side of the light transmission part 22 and a shorter upper base in the lower base side of the light transmission part 22. The space is filled with necessary materials described later, which forms a light absorption part 23. This embodiment has a linking part 24 that links the adjacent light transmission parts 22 together in their longer lower base sides.

A refractive index of the light transmission part 22 is represented by Nt. Such a light transmission part 22 can be formed by curing transmission part constituting components. A non-limiting value of the refractive index Nt is preferably no less than 1.55 in view of proper total reflection of light on the interface between inclines of the trapezoidal cross sections of the light transmission part 22 and the light absorption part 23 as described below. More preferably the refractive index is no less than 1.56. It is noted that the refractive index Nt is preferably no more than 1.61 because most of materials of excessively high refractive indexes easy to crack.

Here, examples of components constituting the light transmission part include epoxy acrylate, urethane acrylate, polyether acrylate, polyester acrylate and polythiol based ionizing radiation (like ultraviolet) curable type resin.

The light absorption part 23 is arranged in the above described space that is formed between the adjacent light transmission parts 22, and its shape of a cross section is same as that of the space. Therefore, the cross section of the light absorption part 23 is an isosceles trapezoid whose shorter upper base faces the substrate layer 25 side (observer side) and whose longer lower base faces the opposite side (surface light source device 11 side). A refractive index of the light absorption part 23 is represented by Nr. The light absorption part 23 is configured so as to be able to absorb light. Specifically, light absorbing particles disperse into binder having the refractive index of Nr. The refractive index Nr is lower than the refractive index Nt of the light transmission part 22. A non-limiting value of the refractive index Nr is preferably no more than 1.50, and more preferably no more than 1.49. The reference index Nr is preferably no less than 1.47 in view of availability.

Non-limiting difference between the refractive index Nt of the light transmission part 22 and the refractive index Nr of the light absorption part 23 is preferably no less than 0.05. As well, a non-limiting upper limit of the difference in refractive index is preferably no more than 0.14 in view of availability of materials.

Non-limiting examples of materials used as the binder here include photocurable resin such as urethane (meth) acrylate, polyester (meth)acrylate, epoxy (meth)acrylate and butadiene (meth)acrylate.

While light absorbing colored particles such as carbon black are preferably used as the light absorbing particles, the light absorbing particles are not limited thereto. Colored particles that selectively absorb a specific wavelength may be used for the light absorbing particles depending on characteristics of an image light. Specific examples of colored particles include carbon black, graphite, metallic salts such as black iron oxide, organic fine particles colored with dyes, pigments and the like, and colored glass beads. Especially, colored organic fine particles are preferably used in view of the cost, quality, availability and so on. An average particle size of colored particles is preferably 0.01 μm to 20 μm.

In this embodiment, 78.2% to 88.5% is a percentage of the cross-sectional area of the light transmission part 22 in the total cross-sectional area of one adjacent light transmission part 22 and light absorption part 23 (this is the cross-sectional area that is in the cross section appearing in FIG. 4, and that is in the direction orthogonal to the direction where the light transmission part 22 and the light absorption part 23 extend) (this percentage is referred to as "a proportion of the cross-sectional area of the light transmission part"). Here, the light transmission part 22 is that existing between adjacent light absorption parts 23, and in this embodiment, the cross-sectional area of the light transmission part 22 is that of an isosceles trapezoid, as shown by S1 in FIG. 4. The cross-sectional area of the light absorption part 23 is that of an isosceles trapezoid in this embodiment as shown by S2 in FIG. 4.

This makes it possible to realize a high level of the efficiency of light utilization while a predetermined light blocking effect is kept. If the proportion of the cross-sectional area of the light transmission part is smaller than 78.2%, the efficiency of utilization of light supplied from the light source gets low. On the other hand, if the proportion of the cross-sectional area of the light transmission part is beyond 88.5%, the light blocking effect deteriorates, which results in transmission of light that is to be removed. In addition, if the proportion of the cross-sectional area of the light transmission part is beyond 88.5%, the light absorption part gets minuter, which makes it difficult to make the light absorption part of a high accuracy.

There is nothing special to be limited in addition to the above. The light transmission part 22 and the light absorption part 23 may be formed as follows as an example. That is, a p 1 4 1 1 itch of the light transmission part 22 and the light absorption part 23, which is shown by Pk in FIG. 3, is preferably 30 μm to 100 μm. It is also preferable that: the interface between inclines of the light absorption part 23 and the light transmission part 22, and a normal line to the surface of the optical function layer 21 be at an angle within the range of 0° to 10°, which is shown by θk in FIG. 4. It is also preferable that thickness of the light absorption part 23, which is shown by Dk in FIG. 3, be 60 μm to 150 μm. The pitch, angle and thickness within the above ranges allow balance between light transmission and light absorption to be much better.

This embodiment shows an example that the interface between the light transmission part 22 and the light absorption part 23 (leg part) is in a straight line on the cross section. The interface is not limited thereto, and may be in a zigzag line, a curved convex surface, a curved concave surface, or the like. A plurality of the light transmission parts 22 and the light absorption parts 23 may have the same shape of the cross sections, and may have different shapes thereof with predetermined regularities.

In this embodiment, the optical sheet 20 can be structured so that its optical diffuse reflectance measured in its light output side is 1.9% to 3.5%. This makes it possible to prevent interference fringes and scintillation, and at the same time to highly secure a demanded light blocking effect of the optical sheet 20. If this optical diffuse reflectance is smaller than 1.9%, interference fringes and scintillation (glare) are easy to be generated. In contrast, if this optical diffuse reflectance is larger than 3.5%, there is a risk that some problem arises in the light blocking effect.

Means of making the optical diffuse reflectance measured in the light output side of the optical sheet 20, 1.9% to 3.5% is not especially limited. Examples of this means include known light diffusing means such as: making a surface of the substrate layer 25 rough; and dispersing light-scattering particles into the substrate layer 25.

Such optical diffuse reflectance is not decided only depending on a mode of the light diffusing means, but is also influenced by modes of the light transmission part and the light absorption part. Thus, the optical diffuse reflectance is related to a whole aspect of the optical sheet.

Further, optical diffuse reflectance measured in the light input side of the optical sheet 20 is preferably 2.5% to 5.0%. This makes it possible to hold down scintillation (so-called glare).

Figure 5:
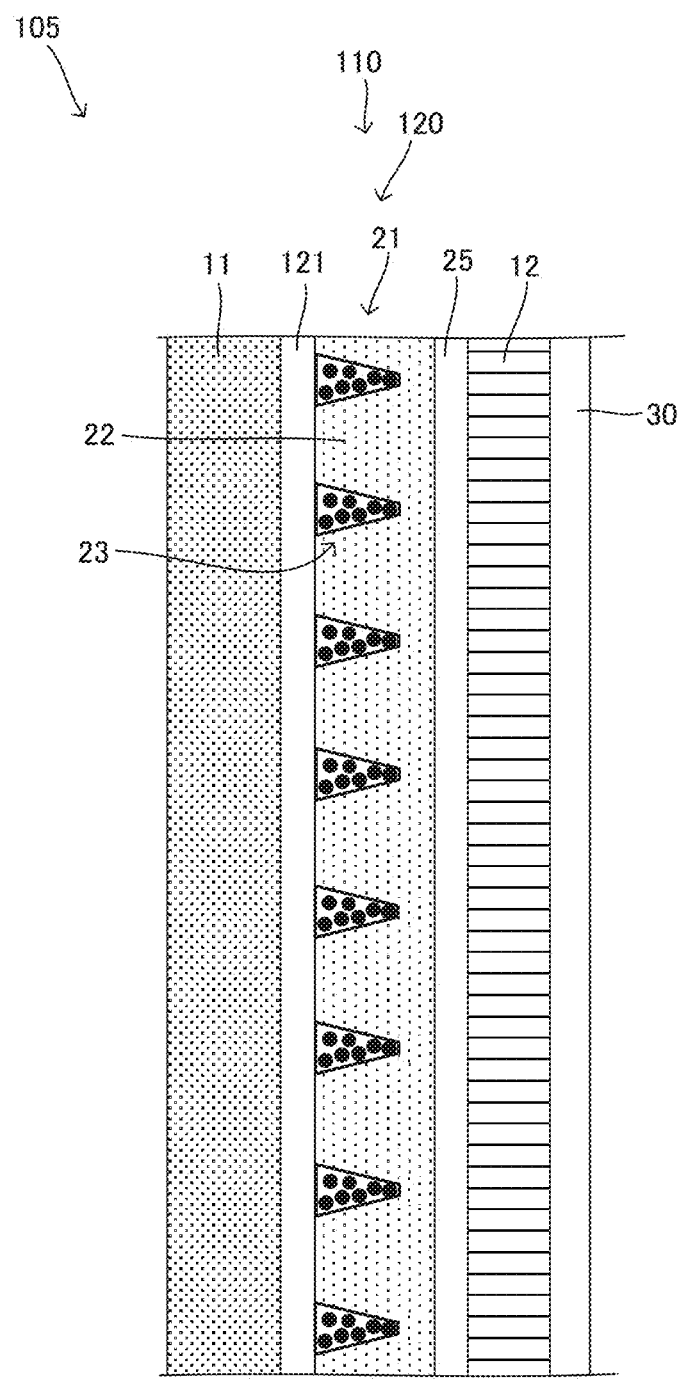
FIG. 5 is a cross-sectional view to explain layer structure of an image source unit 105.

Nothing particular is limited in order to obtain such optical diffuse reflectance in the light input side, and the light input surface of the optical function layer 21 may be adjusted. In addition, for example, a structure as shown in FIG. 5 can be taken. FIG. 5 corresponds to FIG. 3, and is a cross-sectional view showing a layer structure of an image source unit 105. The image source unit 105 includes an optical sheet 120. This optical sheet 120 is structured so that a transparent resin layer 121 is layered on a surface of the above described optical function layer 21 of the optical sheet 20 in the opposite side of the substrate layer 25. Optical diffuse reflectance in its light input side can be a desired value by employing light diffusing means such as: making a surface of the transparent resin layer 121 rough; containing light-scattering particles in the transparent resin layer 121; and employing both means.

In this case as well, the optical diffuse reflectance is not decided only depending on a mode of the light diffusing means, but is also influenced by modes of the light transmission part and the light absorption part. Thus, the optical diffuse reflectance is related to a whole aspect of the optical sheet.

Figure 6A:
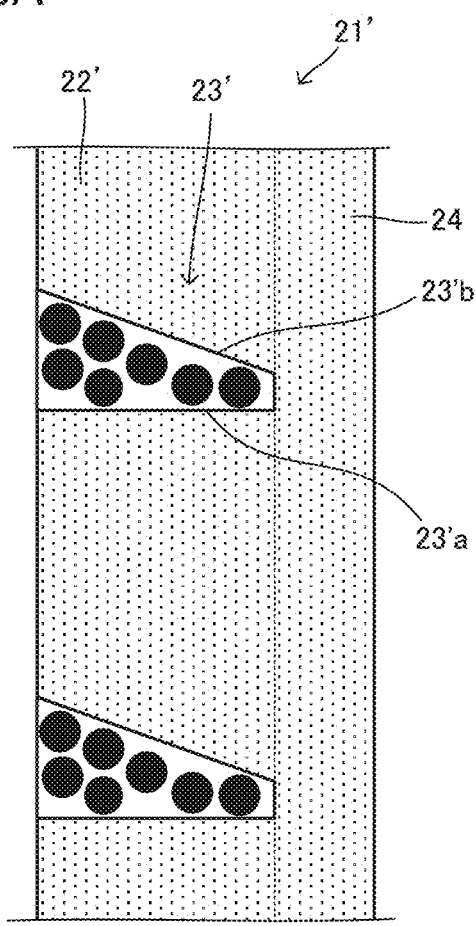
FIG. 6A is a view to explain an optical function layer 21' and FIG. 6B is a view to explain an optical function layer 21"
Figure 6B:
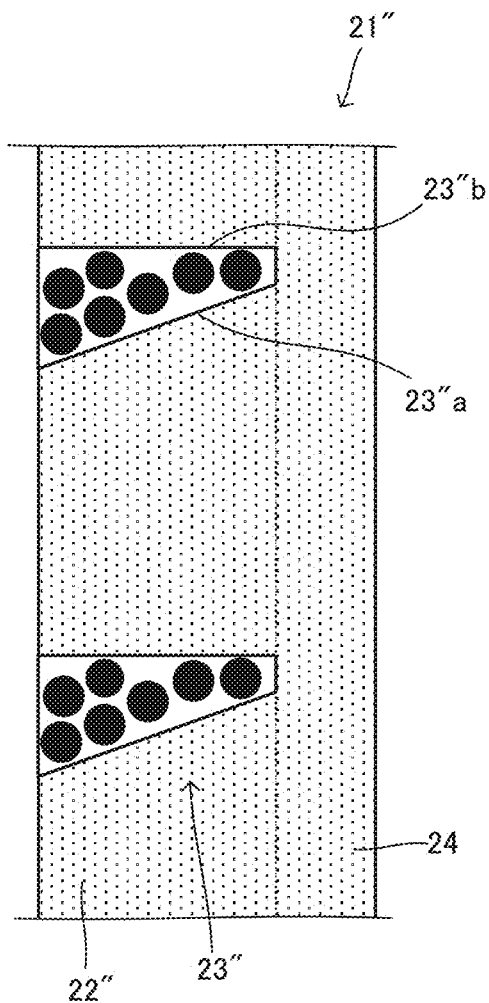

FIGS. 6A and 6B show examples of asymmetric leg parts in the trapezoidal cross sections. FIGS. 6A and 6B correspond to FIG. 4. FIG. 6A shows an example of an optical function layer 21' and FIG. 6B shows an example of an optical function layer 21".

The optical function layer 21' shown in FIG. 6A has light transmission parts 22' and light absorption parts 23'. Materials constituting this, and ways of grasping its refractive index, proportion of the area of the light transmission part, and optical diffuse reflectance are same as those of the optical function layer 21.

As is seen from FIG. 6A, the leg parts of the light absorption part 23' in the trapezoidal cross section have a further feature in this example. Two leg parts of the light absorption part 23' form different angles with a normal line to a layer surface of the optical function layer 21'. In more detail, the angle formed by a leg part 23'a, which is a lower leg part in a state where the image display device is installed, is smaller than that formed by a leg part 23'b, which is an upper leg part in this state. More preferably, the angle formed by the leg part 23'a is 0° (that is, the leg part 23'a is parallel to the normal line to the layer surface of the optical function layer 23'). This makes it possible to efficiently hold down light (image light) travelling upward, and to further hold down reflection in a windshield in a case of installation in a car.

In contrast, the optical function layer 21" shown in FIG. 6B has light transmission parts 22" and light absorption parts 23". Ways of grasping its proportion of the area of the light transmission part, and optical diffuse reflectance are same as those of the optical function layer 21. The optical function layer 21" has a mode that inclines of the leg parts have an inverse relationship to those of the optical function layer 21'. Whereby emission of image light diagonally upward increases. In a case where it is no problem to reflect light in a windshield, a clear image can be observed from a diagonally upward viewpoint.

Such an optical sheet 20 is made as follows for example.

First, the light transmission part 22 is formed on one surface of the substrate layer 25. For this, a substrate sheet that is to be the substrate layer 25 is inserted between a mold roll having such a shape on its surface that the shape of the light transmission part 22 can be copied thereon and a nip roll arranged so as to face the mold roll. Then, the mold roll and the nip roll are rotated while composition for constituting the light transmission part is supplied between the substrate sheet and the mold roll. Whereby, the composition for constituting the light transmission part is filled into grooves (have a shape of an inverted light transmission part) formed on the surface of the mold roll, which correspond to the light transmission part, and thus the shape of the composition corresponds to that of the surface of the mold roll.

The composition for constituting the light transmission part, which is sandwiched and filled between the mold roll and the substrate sheet, is irradiated with light for curing in the substrate sheet side by a light irradiation device, which makes it possible to cure the composition and fix its shape.

Then, the substrate layer 25 and the molded light transmission part 22 are separated from the mold roll by means of a release roll.

Next, the light absorption part 23 is formed. In order to form the light absorption part 23, first, composition for constituting the light absorption part is filled into intervals between the above molded light transmission parts 22. Thereafter, an excessive amount of the composition is scraped off by a doctor blade or the like. Then, the remaining composition is irradiated with ultraviolet rays in the light transmission part 22 side to be cured, to form the light absorption part 23.

Examples of the function layer 30 include known layers arranged nearer to the observer side than the liquid crystal panel and having various functions, such as anti-reflection layers, anti-glare layers and hardcoat layers.

The image source unit 5 having the structure as described above can be made as follows for example: that is, the made optical sheet 20 is arranged in the light emission side of the surface light source device 11 so that a side thereof opposite to the substrate layer 25 (that is, the optical function layer 21) faces the surface light source device 11. The liquid crystal panel 12 and the function layer 30 are layered on the observer side of the optical sheet 20.

The image source unit 5 structured as above is housed into the housing 2, and the housing 2 is arranged so that the function layer 30 side is in the observer side, which makes it possible to structure the image display device 1. At this time, electric circuits, power supply circuits and the like for operating the image source unit 5 are also provided if necessary.

Such an image display device is installed in a car, and operates as follows for example, which will be described with examples of optical paths. These examples of optical paths are for the description and thus conceptual, and do not illustrate reflection, refraction or the like strictly.

When the image display device 1 is operated, the surface light source device 11 emits lighting as shown in FIG. 3. Light L10 emitted from the surface light source device 11 transmits the optical sheet 20 without reaching any interface between the light transmission part 22 and the light absorption part 23, transmits the liquid crystal panel 12 as obtaining image information in the liquid crystal panel 12, and also transmits the function layer 30, to reach the observer side. An observer can observe the image light.

Light L11 emitted from the surface light source device 11 reaches an interface between the light transmission part 22 and the light absorption part 23. Total reflection occurs in the light L11 in relation to difference between both in refractive index and its incidence angle at the interface. The light L11 transmits the liquid crystal panel 12 as obtaining image information in the liquid crystal panel 12, and also transmits the function layer 30, to be emitted in the observer side. At this time, since the interface between the light transmission part 22 and the light absorption part 23 inclines to the normal line to the light output surface of the optical sheet 20 as described above, the direction of the light L11 is changed downward, and the light is blocked from travelling upward (light blocking is carried out), which prevents the light L11 from being reflected in a windshield. Since the light L11 directs in the front direction, such light L11 also contributes to improvement of front brightness of image light.

Light L12 emitted from the surface light source device 11 reaches an interface between the light transmission part 22 and the light absorption part 23, transmits the interface in relation to difference between both in refractive index and its incidence angle at the interface, and is absorbed by the light absorption part 23. This blocks the light from travelling upward (light blocking is carried out), and prevents the light from being reflected in a windshield.

Since the proportion of the cross-sectional area of the light transmission part is constituted as described above in this embodiment, a stray light like the light L12 is absorbed, and at the same time light emitted in the observer side like the light L10 and the light L11 can be efficiently obtained, which makes it possible to keep the efficiency of utilization of light high.

Optical diffuse reflectance in at least the light output side of the optical sheet is constituted as described above in this embodiment, occurrence of interference fringes can be held down, and light can be blocked from travelling in an unintended direction due to diffusion of the light (in this embodiment, reflection in a windshield due to light travelling upward), which makes it possible to carry out light blocking. Therefore, a high light blocking effect can be kept, and high front brightness can be achieved.

Figure 7:
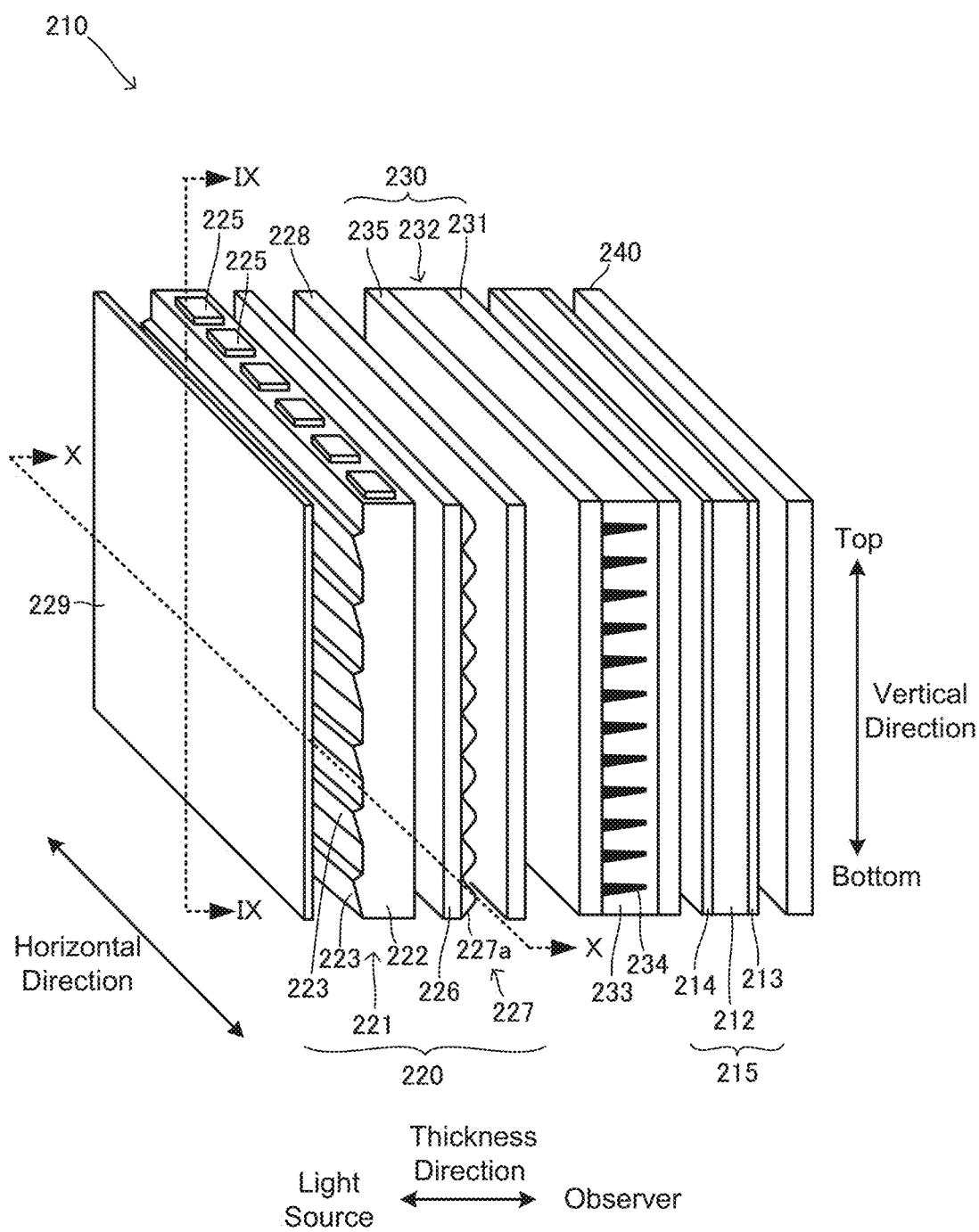
FIG. 7 is an explanatory exploded perspective view of an image source unit 210.
Figure 8:
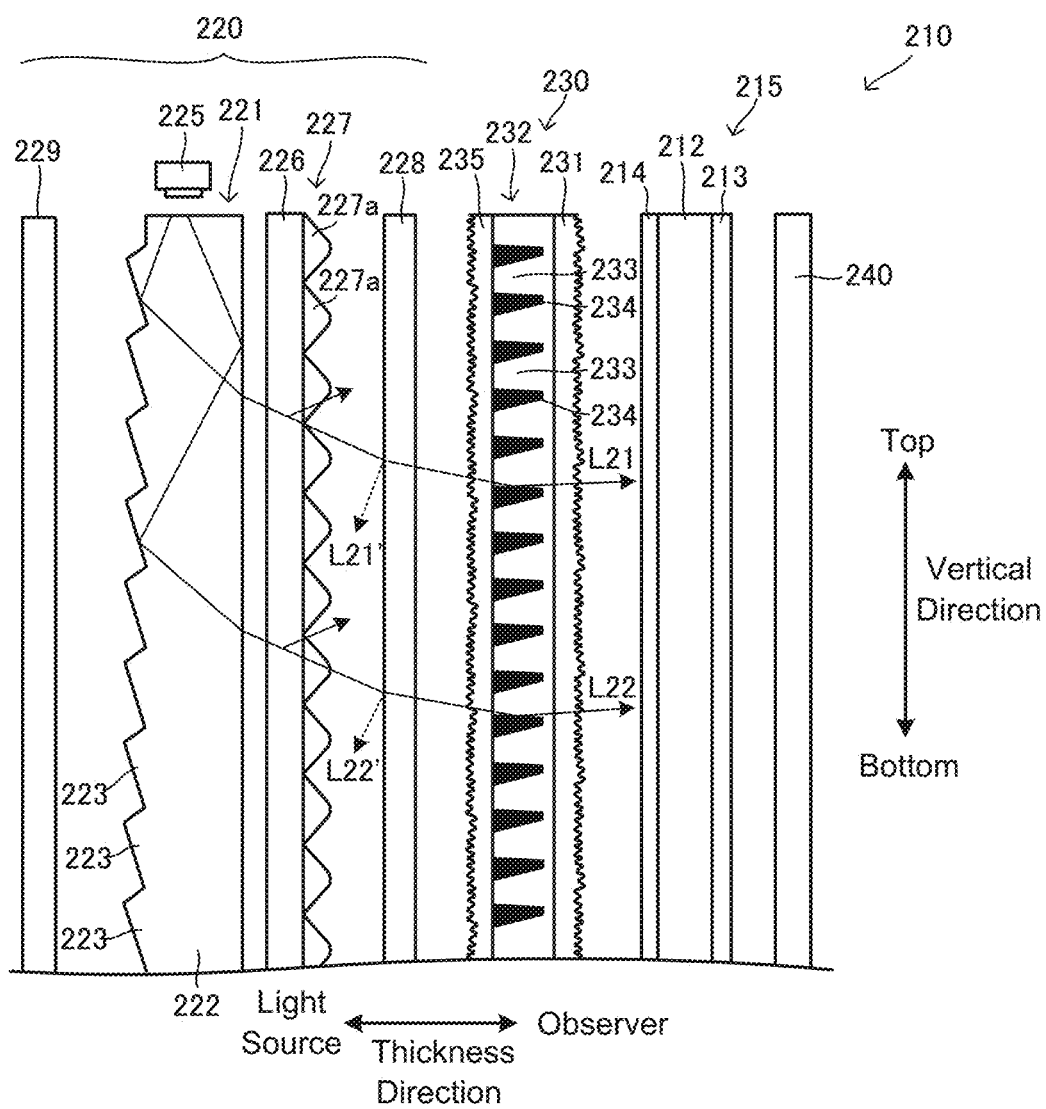
FIG. 8 is an exploded view showing a cross section of the image source unit 210.
Figure 9:
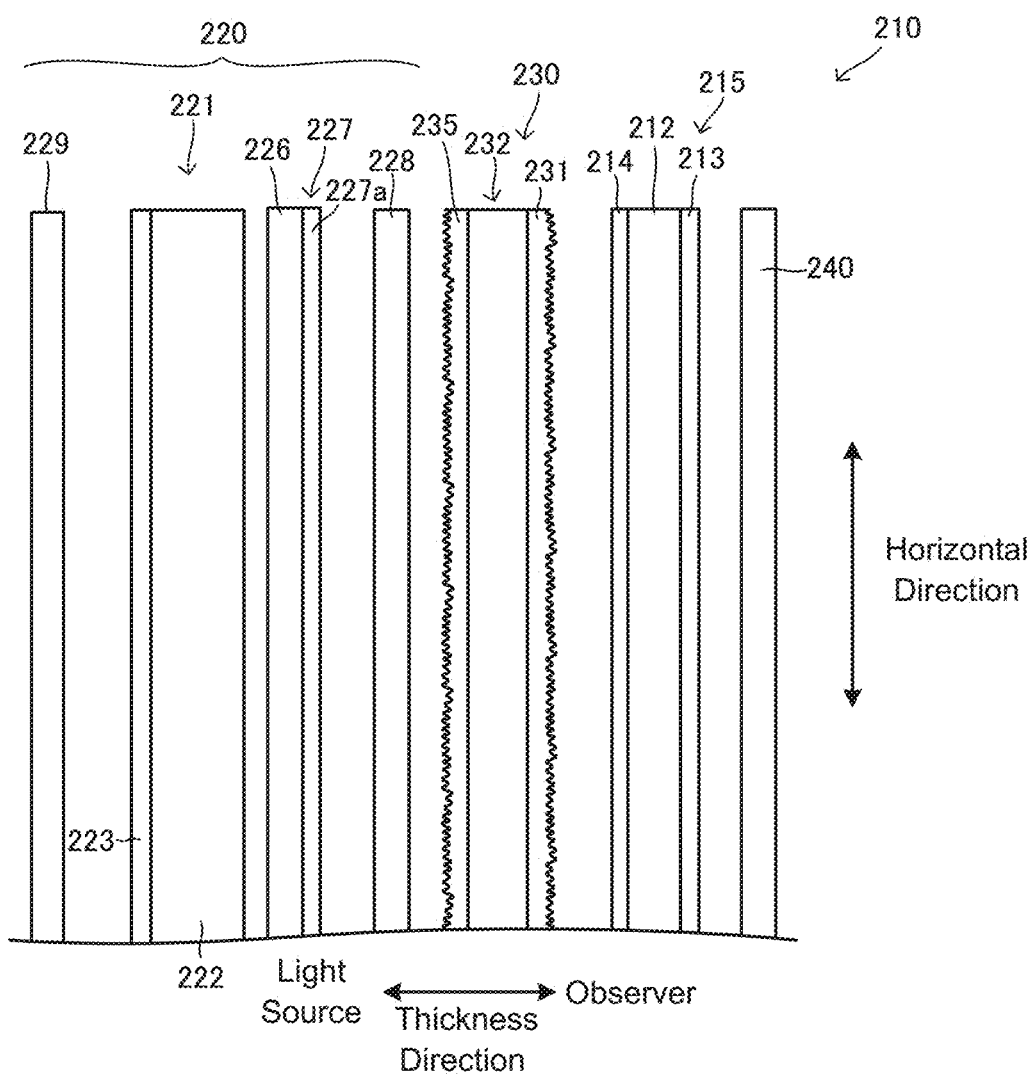
FIG. 9 is an exploded view showing another cross section of the image source unit 210.

FIG. 7 is an explanatory view of a second embodiment, and is an exploded perspective view of an image source unit 210 including an optical sheet 230. FIG. 8 shows part of an exploded perspective view of the image source unit 210, taken along the line IX-IX in FIG. 7. FIG. 9 shows part of the exploded perspective view of the image source unit 210, taken along the line X-X in FIG. 7.

According to the example of the housing 2, the image source unit 210 is housed into a housing together with ordinary devices required for working the image source unit 210 such as a power source for working the image source unit 210, and an electronic circuit that controls the image source unit 210, to form a liquid crystal display device. Hereinafter the image source unit 210 will be described.

The image source unit 210 includes a liquid crystal panel 215, a surface light source device 220, the optical sheet 230, and a function layer 240. FIGS. 7 to 9 also show directions for the image source unit 210 when the image source unit 210 is used as a display device.

The liquid crystal panel 215 includes an upper polarizing plate 213 that is arranged on an observer side, a lower polarizing plate 214 that is arranged on a surface light source device 220 side, and a liquid crystal layer 212 that is arranged between the upper polarizing plate 213 and the lower polarizing plate 214. The upper polarizing plate 213 and the lower polarizing plate 214 have functions of decomposing incident light to two orthogonal polarized components (P wave and S wave), transmitting a polarized component in one direction (direction parallel to a transmission axis) (for example, P wave), and absorbs a polarized component in another direction, which is orthogonal to the one direction (direction parallel to an absorbing axis) (for example, S wave).

In the liquid crystal layer 212, a plurality of pixels are aligned vertically and horizontally, in the direction along the layer surface. An electric field can be generated at each region where one pixel is formed. Orientations of pixels to which an electric field is applied change, which rotates a polarization direction of the polarized component parallel to the transmission axis which is transmitted through the lower polarizing plate 214 arranged on the surface light source device 220 side (that is, light input side) (for example, P wave), by 90° when the polarized component passes through pixels at which an electric field is generated. On the other hand, this polarized component keeps its polarization direction when passing through pixels at which an electric field is not generated. Therefore, it can be controlled whether the polarized component transmitted through the lower polarizing plate 214 (for example, P wave) is further transmitted through the upper polarizing plate 213 arranged on the light output side, or absorbed and shut out by the upper polarizing plate 213, depending on whether an electric field is generated at pixels or not.

The liquid crystal panel 215 has such a structure so as to control transmission and shutting out of light from the surface light source device 220 for each pixel, to display an image.

The liquid crystal panel is configured so as to be able to offer an image to an observer on the principle as described above. Thus, when light is shined from the back face side of the liquid crystal panel, it is possible to transmit light through the lower polarizing plate in such a way that light having the polarized component parallel to the transmission axis of the lower polarizing plate reaches the lower polarizing plate a lot, to improve efficiency of light utilization.

The liquid crystal panel is superior in contrast and efficiency (transmissivity) of emitted light corresponding to incident light in a direction of the normal line of the liquid crystal panel, because of characteristics thereof. However, low contrast and low efficiency (transmissivity) caused by incident light diagonal to the direction of the normal line of the liquid crystal panel, and those when an observer observes in a diagonal direction are problematic. That is, it is also effective to increase the amount of incident light in the direction of the normal line of the liquid crystal panel for improving efficiency of light utilization.

A type of the liquid crystal panel is not specifically restricted, and a liquid crystal panel of any known type can be used. Examples thereof include TN, STN, VA, MVA, IPS, and OCB.

The surface light source device 220 will be described.

The surface light source device 220 is arranged on the opposite side of the observer side across the liquid crystal panel 215, and is an illuminator emitting surface light to the liquid crystal panel 215. As seen from FIGS. 7 to 9, the surface light source device 220 of this embodiment is configured as an edge-lit surface light source device, and has a light guide plate 221, a light source 225, a light guide plate diffuser plate 226, a prism layer 227, a reflective polarizing plate 228, and a reflection sheet 229.

As seen from FIGS. 7 to 9, the light guide plate 221 has a base part 222, and back face optical elements 223. The light guide plate 221 is a tabular member as a whole, and is formed by material having transmissivity. One tabular surface of the light guide plate 221 of this embodiment which is on the observer side is a flat face, and another tabular surface that is on the opposite side of the one tabular surface is a back face. A plurality of the back face optical elements 223 are aligned on the back face.

Various materials can be used as material forming the base part 222 and the back face optical elements 223 as long as being widely used as material for an optical sheet incorporated in a display device, having excellent mechanical characteristics, optical properties, stability, processability, etc., and being available at low cost. Examples thereof include thermoplastic resin such as polymer resin having an alicyclic structure, methacryl resin, polycarbonate resin, polystyrene resin, styrene acrylonitrile copolymer, styrene methyl methacrylate copolymer, ABS resin, and polyethersulfone, and epoxy acrylate based or urethane acrylate based reactive resin (such as ionizing radiation curable type resin).

The base part 222 is a portion inside which light is guided, and which is a base of the back face optical elements 223. The base part 222 is a tabular portion, and has a predetermined thickness.

The back face optical elements 223 are protruding elements formed on the back face side (opposite side of a side where the reflective polarizing plate 228 is arranged) of the base part 222. In this embodiment, the back face optical elements 223 have shapes of triangular columns. Ridgelines of protruding peaks of the columnar back face optical elements 223 extend in a horizontal direction. A plurality of the back face optical elements 223 are aligned in a direction orthogonal to the extending direction at predetermined intervals. The cross section of each back face optical element 223 of this embodiment is a triangle, but not restricted to this. The cross section may have any shape such as a polygon, a hemisphere, part of a sphere, and a lens.

A direction of aligning a plurality of the back face optical elements 223 is preferably a light guiding direction. That is, the back face optical elements 223 are aligned in a direction separating the light source 225, and the ridgelines of the back face optical elements 223 extend parallel to a direction of aligning the light source 225, or a direction where the light source extends if the light source is one long light source.

A shape of "a triangle" in the present description not only strictly means a triangular shape, but also means an approximate triangular shape caused by the limits of manufacturing techniques, fluctuation upon molding, etc. Likewise, other terms used in the present description for identifying shapes and geometrical conditions such as "parallel", "orthogonal", "ellipse", and "circle" shall not only strictly mean their shapes and conditions, but also mean their approximate shapes and conditions with which optical functions same as strict shapes and conditions are expectable despite their fluctuation.

The light guide plate 221 having such a structure can be produced by extrusion molding, or by shaping the back face optical elements 223 on the base part 222. In the case of the light guide plate 221 produced by extrusion molding, the base part 222 and the back face optical elements 223 can be integrally formed. When the light guide plate 221 is produced by shaping, material for the back face optical elements 223 may be either the same resin material as, or different from the base part 222.

Returning to FIGS. 7 to 9, the light source 225 will be described. The light source 225 is arranged on one side face of the base part 222 of the light guide plate 221 which is on one side in the direction of aligning a plurality of the back face optical elements 223. A type of the light source is not specifically restricted. The light source can be configured to have various aspects such as a fluorescent light of a linear cold-cathode tube, etc., a point LED (light emitting diode), and an incandescent lamp. The light source 225 of this embodiment consists of a plurality of LEDs, and is configured so as to separately and independently turn on and off each LED, and/or adjust brightness of each turned-on LED, using a controlling device that is not shown.

While this embodiment shows an example of the light source 225 arranged on one side face as described above, the light source may be further arranged on a side face that is on the opposite side of the one side face as well. In this case, the back face optical elements are shaped according to known examples.

The light guide plate diffuser plate 226 will be described. The light guide plate diffuser plate 226 is arranged on the light output side of the light guide plate 221, and is a diffuser plate having a function of diffusing and emitting incident light that enters the light guide plate diffuser plate 226. Whereby, uniformity of light emitted from the light guide plate 221 can be further improved, and to make scratches that can exist on the light guide plate 221 can be made to be inconspicuous.

A known light diffuser plate can be used as the light guide plate diffuser plate. Examples of a specific aspect of the light guide plate diffuser plate include a structure of dispersing a light diffuser agent in a base material.

The light guide plate diffuser plate 226 may function as a support of the prism layer 227 as this embodiment. When the light output surface of the light guide plate 221 is smooth, the light guide plate diffuser plate 226 and the light guide plate 221 may be integrally configured.

As seen from FIGS. 7 to 9, the prism layer 227 is provided closer to the liquid crystal panel 215 side, than the light guide plate diffuser plate 226. The prism layer 227 is a layer having unit prisms 227a that are convex toward the liquid crystal panel 215 side.

The unit prisms 227a of this embodiment have shapes of having predetermined cross sections, and extending in a direction orthogonal to the light guiding direction of the light guiding plate 221. A plurality of the unit prisms 227a are aligned in the light guiding direction. Whereby, light can be condensed in a direction where light is controlled in an optical function layer 232 (vertical direction in this embodiment), to make total reflection of light effectively occur in the optical function layer 232, and efficiency of light utilization can be improved. A wide viewing angle can be realized in a horizontal direction.

Known shapes can be applied to cross-sectional shapes of the unit prisms of the prism layer according to required functions. Light can be further diffused and condensed according to these shapes.

Directions where the unit prisms extend and are aligned are not restricted to the above described embodiment, and may have another mode. Examples thereof include a mode that the unit prisms have predetermined cross sections, and extend in the light guiding direction of the light guide plate 221, and a plurality of the unit prisms are aligned in a direction orthogonal to the light guiding direction.

The reflective polarizing plate 228 will be described. The reflective polarizing plate 228 has functions of decomposing incident light to two orthogonal polarized components (P wave and S wave), transmitting a polarized component in one direction (direction parallel to a transmission axis) (for example, P wave), and reflects a polarized component in another direction, which is orthogonal to the one direction (direction parallel to a reflection axis) (for example, S wave). A known structure can be applied to that of the reflective polarizing plate.

The reflection sheet 229 is a member for reflecting light emitted from the back face of the light guide plate 221, and making the light enter the light guide plate 221 again. As the reflection sheet 229, a sheet that enables so-called specular reflection to occur, such as a sheet made by a material having high reflectance such as metal, and a sheet comprising a thin film made by a material having high reflectance (for example, a metal thin film) as a surface layer can be preferably employed.

Figure 10:
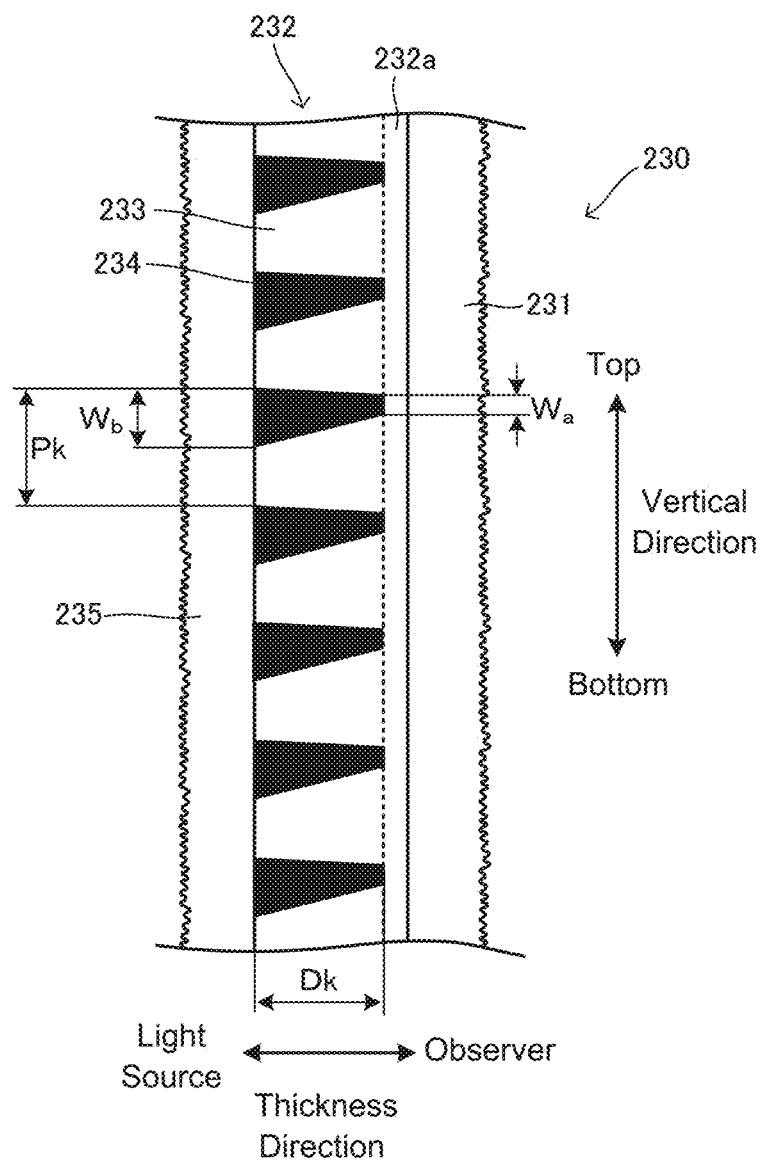
FIG. 10 is an enlarged view focusing on an optical sheet 230.

The optical sheet 230 will be described. FIG. 10 is an enlarged view of part of the optical sheet 230 from the point of view of FIG. 8. As seen from FIGS. 7 to 10, the optical sheet 230 of this embodiment includes a substrate layer 231 that is arranged between the liquid crystal panel 215 and the surface light source device 220, and is formed into a sheet, the optical function layer 232 that is provided on one face of the substrate layer 231 (face on the light guide plate 221 side in this embodiment), and a light diffuser layer 235.

The substrate layer 231 is a sheet member like a flat plate which supports the optical function layer 232.

Various materials can be used as material forming the substrate layer 231 as long as being widely used as material for an optical sheet incorporated in a display device, having excellent mechanical characteristics, optical properties, stability, processability, etc., and being available at low cost. Examples thereof include polyethylene terephthalate resin (PET), triacetyl cellulose resin (TAC), methacryl resin, and polycarbonate resin. Among them, in view of combination with the surface light source device 220 and the lower polarizing plate 214, TAC, methacryl resin, and polycarbonate resin which bring low birefringence (retardation) are preferably used. Further, for uses that require a high heat resisting property such as an in-vehicle use, polycarbonate resin which has a high glass transition temperature is desirable. Specifically, the glass transition temperature of polycarbonate resin is 143° C. Polycarbonate resin is suitable for an in-vehicle use which generally requires durability at 105° C.

Here, a surface of the substrate layer 231 which is on the opposite side of the side where the optical function layer 232 is arranged may be a rough surface. This rough surface is preferably formed so that the optical diffuse reflectance of the optical sheet 230 on the substrate layer side is 0.8% to 5.0%/o although not specifically limited. Whereby, light emitted from the substrate layer 231 can be diffused, which makes it possible to make a viewing angle of image light provided by the image source unit 210 wide.

The optical function layer 232 is a layer laminated to one face of the substrate layer 231 (face on the light guide plate 221 side in this embodiment). Light transmission parts 233 and light absorption parts 234 are aligned by turns along the layer surface.

The optical function layer 232 has a cross section shown in FIG. 10, and has a shape extending into and out of the page (in a horizontal direction when the image source unit 210 is viewed from the front). That is, the optical function layer 232 includes the light transmission parts 233 that are approximate trapezoids on the cross section appearing in FIG. 10, and the light absorption parts 234 having cross sections of approximate trapezoids, each of which is formed between two adjacent light transmission parts 233.

The light transmission parts 233 are portions whose main function is to transmit light. In this embodiment, the light transmission parts 233 are elements having approximately trapezoidal cross-sectional shapes of longer lower bases on the substrate layer 231 side, and shorter upper bases on the opposite side thereof (light guide plate 221 side), on the cross section appearing in FIGS. 8 and 10. The light transmission parts 233 extend in the above described direction along the layer surface of the substrate layer 231 while keeping their cross sections, and are aligned at predetermined intervals in a direction different from this extending direction. Spaces of approximately trapezoidal cross sections are formed between adjacent light transmission parts 233. Thus, these spaces have trapezoidal cross sections having longer lower bases on the upper base side of the light transmission parts 233 (light guide plate 221 side), and shorter upper bases on the lower base side of the light transmission parts 233 (substrate layer 231 side, liquid crystal panel 215 side). The spaces are filled with necessary material described later, which forms the light absorption parts 234. In this embodiment, a sheet linking part 232a links adjacent light transmission parts 233 together at their longer lower base sides.

The refractive indexes of the light transmission parts 233 and light absorption parts 234, and difference between their refractive indexes can be considered same as those of the light transmission parts 22 and light absorption parts 23 described above.

For example, the light transmission parts 233 and the light absorption parts 234 are formed in the optical function layer 232 as follows, although not specifically limited. That is, a pitch of one light transmission part 233 and one light absorption part 234 which is shown by Pk in FIG. 10 is preferably 20 pin to 100 μm, and more preferably 30 μm to 100 μm. The thickness of the light absorption parts 234 which is shown by Dk in FIG. 10 is preferably 50 μm to 150 μm, and more preferably 60 μm to 150 μm. The pitch and thickness within the above ranges make it possible to attain a more proper balance between light transmission and light absorption.

Figure 11:
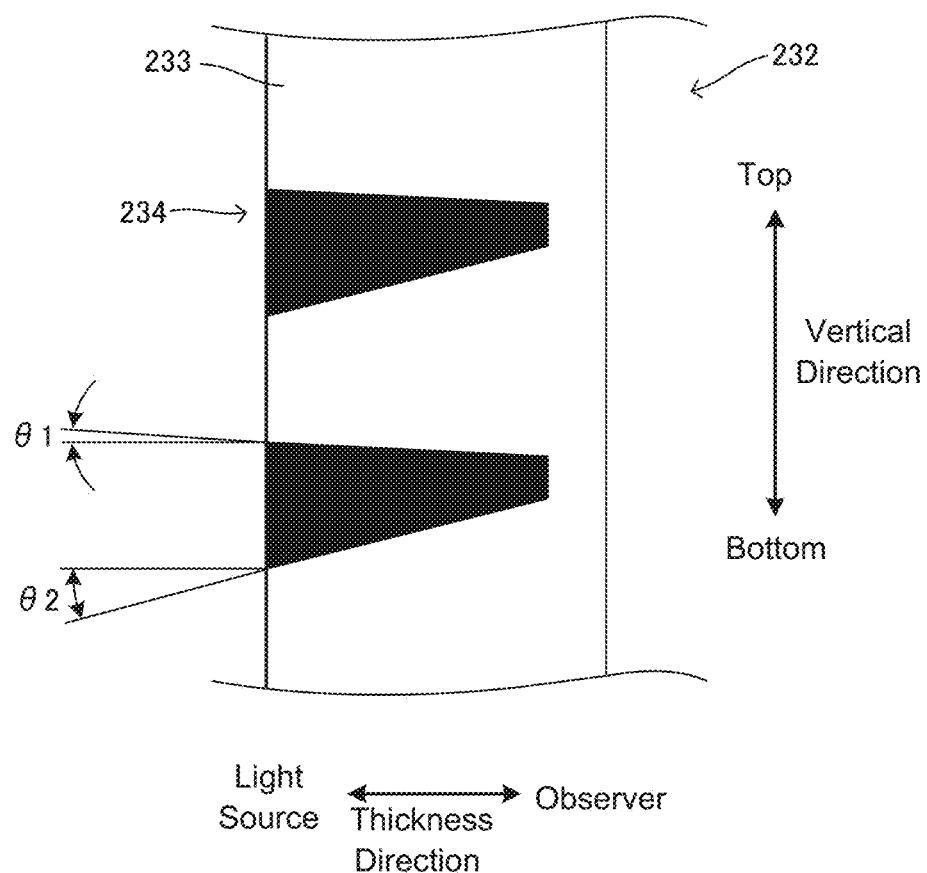
FIG. 11 is an explanatory view of angles θ1 and θ2 that are formed by interfaces of light transmission parts 233 and light absorption parts 234, and the normal line of the layer surface of a light function layer 232.

FIG. 11 is an explanatory view of angles θ1 and θ2 that are formed by the interfaces between the light absorption parts 233 and the light transmission parts 234, and the normal line of the layer surface of the optical function layer 232. FIG. 11 is an enlarged view of part of the optical function layer 232 of FIG. 10. θ1 shows a size of an angle formed by the interfaces between the light transmission parts 233 and light absorption parts 234 which is on the upper side of the light absorption parts 234, and the normal line of the layer surface of the optical function layer 232, in the state shown in FIGS. 7 to 11. θ2 shows a size of an angle formed by the interfaces between the light transmission parts 233 and light absorption parts 234 which is on the lower side of the light absorption parts 234, and the normal line of the layer surface of the optical function layer 232, in the state shown in FIGS. 7 to 11. In this embedment, the relationship between the sizes of θ1 and θ2 is preferably θ1<θ2. Whereby, it is possible to make a viewing angle of image light provided by the image source unit 210 on the upper side wider than that on the lower side.

The numerical ranges of θ1 and θ2 are not specifically restricted as long as the relationship between their sizes is θ1<θ2, but θ1 and θ2 are preferably 0° to 10°. It is noted that the numerical ranges of θ1 and θ2 restricted to the following ranges on the premise that the relationship is θ1<θ2 make it possible to further improve visibility in a driver's view.

That is, θ1 is more preferably no more than 4.0°, further preferably no more than 1.0°, and especially preferably 0°. θ2 is more preferably no more than 5.0°, and further preferably no more than 3.0°. Whereby, the proportion of brightness of light emitted in an upper direction than the normal line of the sheet surface, to that emitted in the direction of the normal line (front brightness) can be improved.

θ1 larger than 0° means the interfaces downward from the surface light source device side to the observer side. θ2 larger than 0° means the interfaces upward from the surface light source device side to the observer side.

This embodiment shows an example that the interfaces between the light transmission parts 233 and the light absorption parts 234 are in straight lines on the cross section. The interfaces are not limited thereto, and may be in zigzag lines, curved convex surfaces, curved concave surfaces, or the like. A plurality of the light transmission parts 233 and the light absorption parts 234 may have the same shape of the cross sections, and may have different shapes thereof from each other with predetermined regularities.

Returning to FIG. 10, the light diffuser layer 235 will be described. In this embodiment, the light diffuser layer 235 is arranged on one surface of the optical function layer 232 which is on the opposite side where the substrate layer 231 is arranged (light guide plate 221 side in this embodiment). A rough surface is formed on the light input side of the light diffuser layer 235. This rough surface is preferably formed so that the optical diffuse reflectance of the optical sheet 230 on the light diffuser layer side is 0.8% to 5.0%. Whereby, incident light in the direction of the normal line of the sheet surface of the light diffuser layer 235 can be diffused in a direction diagonal to the direction of the normal line, which makes it possible to make a viewing angle of image light provided by the image source unit 210 wide.

The material same as the light transmission parts 233 can be used as material forming the light diffuser layer 235.

Brightness of light emitted from the optical sheet 230 is preferably controlled as follows: that is, the optical sheet 230 is preferably structured so that brightness of light emitted at 20° upward in an vertical direction and 0° in a horizontal direction of the normal line of the liquid crystal panel is no less than 70% of the front brightness, and further preferably structured so that the brightness is no less than 90% thereof. The optical sheet 230 is preferably structured so that brightness of light emitted at 40° in the horizontal direction of the normal line of the panel surface of the liquid crystal panel, and 0° in a vertical direction of this horizontal direction is no less than 90% of the front brightness.

The function layer 240 is arranged on the light output side of the liquid crystal panel 215, and is a layer having functions of improving the quality of image light, and protecting the image source unit 210. Examples thereof include an anti-reflection film, an anti-glare film, a hard coated film, a tone correction film, and a light diffuser film. One of them forms the function layer 240 individually, or a plurality of them form the function layer 240 in combination.

Operation of the image source unit 210 that has the structure as described above will be described with reference to examples of optical paths. The examples of optical paths are for the description and thus conceptual, and does not show degrees of reflection and refraction strictly.

As shown in FIG. 8, light emitted from the light source 225 comes into the inside of the light guide plate 221 via the light input surface that is a side face of the light guide plate 221. FIG. 8 shows an example of optical paths of light L21 and L22 that come into the light guide plate 221 from the light source 225, as an example.

As shown in FIG. 2, total reflection of the light L21 and L22 coming into the light guide plate 221 is repeated on the light output side face of the light guide pate 221 and the back face thereof that is on the opposite side of the light output side surface, due to difference in refractive index from air. The light L21 and L22 travel in the light guiding direction (downward on the page of FIG. 8).

The back face optical elements 223 are arranged on the back face side of the light guide plate 221. Thus, as shown in FIG. 8, the travelling directions of the light L21 and L22 travelling in the light guide plate 221 are changed by the back face optical elements 223, and the light L21 and L22 may come into the light output surface and the back face at incident angles narrower than the critical angle of total reflection. In this case, such light may be emitted from the light output surface of the light guide plate 221 and the back face on the opposite side thereof.

The light L21 and L22 emitted from the light output surface travel toward the light guide plate diffuser plate 226 that is arranged on the light output side of the light guide plate 221. On the other hand, light emitted from the back face is reflected by the reflection sheet 229 that is arranged on the back face side of the light guide plate 221, and comes into the light guide plate 221 again, to travel in the light guide plate 221.

The light travelling in the light guide plate 221, and the light whose direction is changed by the back face optical elements 223 and which reaches the light output surface at an incident angle narrower than the critical angle of total reflection are emitted from every region along the light guiding direction in the light guide plate 221. Therefore, the light travelling in the light guide plate 221 results in gradually emitted from the light output surface. Whereby, it is possible to make distribution of light emitted from the light output surface of the light guide plate 221 along the light guiding direction, uniform.

Thereafter, the light emitted from the light guide plate 221 reaches the light guide plate diffuser plate 226, to improve uniformity. The light is diffused or condensed by the prism layer 227 if necessary. The light coming out from the prism layer 227 reaches the reflective polarizing plate 228. Here, light in a polarization direction along the transmission axis of the reflective polarizing plate 228 is transmitted through the reflective polarizing plate 228, and travels toward the optical sheet 230.

On the other hand, light in a polarization direction along the reflection axis of the reflective polarizing plate 228 is reflected, and returned to the light guide plate 221 side as shown by the dotted arrows L21' and L22' in FIG. 8. The returned light reflects off the light guide plate 221, the back face optical elements 223, or the reflection sheet 229, and travels toward the reflective polarizing plate 228 side again. In this reflection, a polarization direction of part of the light is changed, and this part of the light is transmitted through the reflective polarizing plate 228. The rest of the light is returned to the light guide plate side again. As described above, the light reflecting off the reflective polarizing plate 228 can be transmitted through the reflective polarizing plate 228 by its reflection repeated at other portions. Whereby, efficiency of utilization of the light from the light source 225 can be improved.

Here, the polarization direction of the light emitted from the reflective polarizing plate 228 is the direction along the transmission axis of the lower polarizing plate 214, and this light is polarized light to be transmitted through the lower polarizing plate 214.

Figure 12:
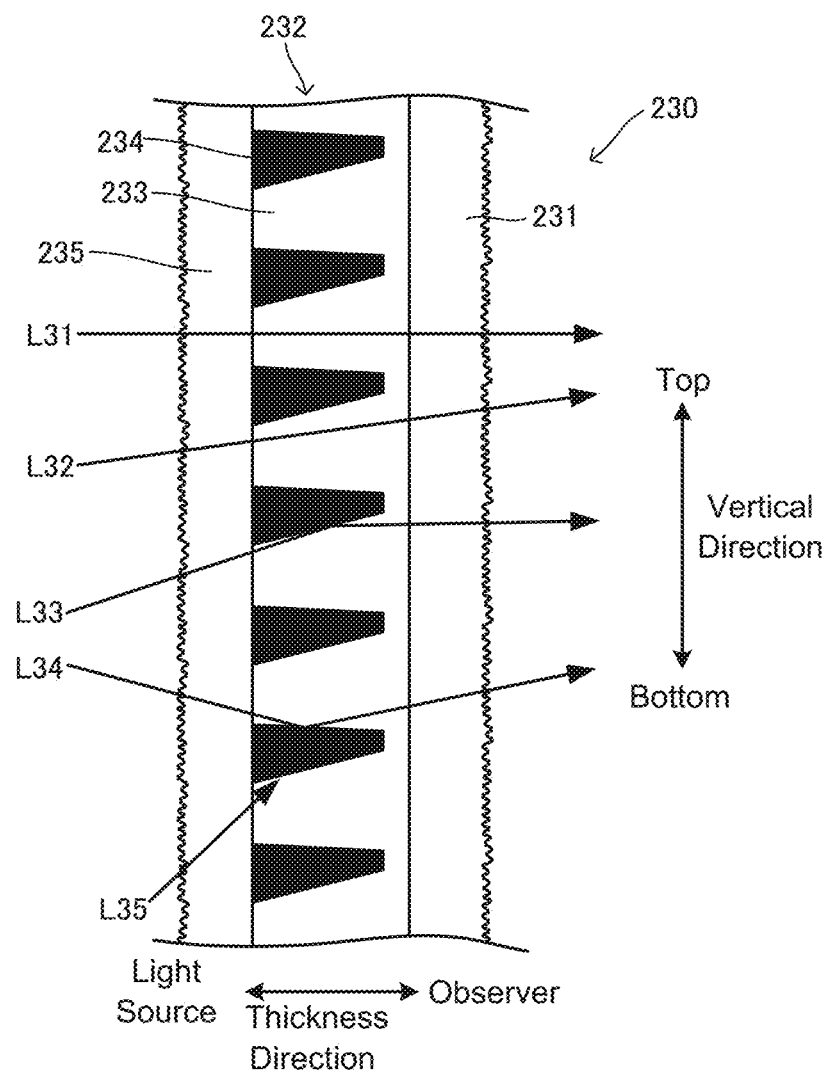
FIG. 12 is an explanatory view of optical paths of light that is transmitted through the optical sheet 230.

The light emitted from the reflective polarizing plate 228 is transmitted through the light diffuser layer 235, and comes into the optical function layer 232. The light coming into the optical function layer 232 travels with the following optical paths:

That is, for example, the light shown by L31 in FIG. 12 is transmitted through the light transmission parts 233 without reaching any interfaces between the light transmission parts 233 and light absorption parts 234. This is emitted on the observer side at an angle close to the front direction.

The light shown by L32 and L33 is light coming into the light transmission parts 233 in a diagonally upper direction for the observer side than the light by L31. The light by L33 comes into the light transmission parts 233 in a diagonally upper direction than the light by L32. The light by L32 is transmitted through the light transmission parts 233 without reaching any interfaces between the light transmission parts 233 and light absorption parts 234. On the other hand, the light by L33 reaches one interface on the lower side of the light absorption parts 234 in the vertical direction in this embodiment, which makes total reflection occur thereto, and the light by L33 is transmitted through the light transmission parts 233. At this time, operation of the angle of inclination (θ2) at the interface between the light transmission part and light absorption part which is on the lower side makes most of the light reflecting off the interface travel in a direction parallel to the normal line of the sheet surface, or in an upper direction that is closer to the direction parallel to the normal line than before, by the reflection.

The light by L34 travels downward for the observer side more than the light by L31, and comes into the light transmission parts 233. The light by L34 reaches one interface on the upper side of the light absorption parts 234 in the vertical direction in this embodiment, which makes total reflection occur thereto, and the light by L34 is transmitted through the light transmission parts 233. At this time, operation of the angle of inclination (θ1) at the interface between the light transmission part and light absorption part which is on the upper side changes the directions of the light by L34 that reflects off the interface, and most of light like this to a direction parallel to or upper than the normal line of the liquid crystal panel 215, and the light by L34 and most of light like this are transmitted through the light transmission parts 233.

Even light to which total reflection does not occur because having an angle narrower than the critical angle of total reflection although reaching an interface of the light absorption part 234 partially reflects off the interface. The direction of such light is changed to the direction parallel to or upper than the normal line of the liquid crystal panel 215, and such light is transmitted through the light transmission parts 233 as well.

In contrast, as shown by L35 in FIG. 12, light coming into the optical function layer 232 at a wide angle for the normal line of the sheet surface is absorbed by the light absorption parts 234, and is not supplied to the liquid crystal panel 215. Therefore, light causing something bad, such as low contrast and reversed color can be absorbed.

As described above, the relationship between the sizes of the angles of inclination θ1 and θ2 at the interfaces between the light transmission parts 233 and the light absorption parts 234 of θ1<θ2 makes it easy to emit the light coming into the optical sheet 230 upward, and makes downward emission restricted. That is, using the optical sheet 230 makes it possible to effectively emit incident light upward, that is, in a driver's view, and to improve brightness of light emitted upward.

Thus, using the optical sheet of this embodiment for a liquid crystal display device makes it possible to improve visibility in a driver's view, compared to the case of using a conventional optical sheet.

Optical paths will be further described. The light emitted from the optical sheet 230 as described above comes into the lower polarizing plate 214 of the liquid crystal panel 215. The lower polarizing plate 214 transmits one polarized component in the incident light, and absorbs the other polarized component. The light transmitted through the lower polarizing plate 214 is selectively transmitted through the upper polarizing plate 213 according to a state of generating an electric field at each pixel. Selective transmission of the light from the surface light source device 220 and the optical sheet 230, through each pixel by the liquid crystal panel 215 as described above makes it possible for an observer of the liquid crystal display device to observe an image. At this time, image light is offered to an observer via the function layer 240, to improve the quality of an image.

Test Examples A

[Structure of Optical Sheet]

Optical sheets were made as Test Examples A according to the example shown in FIGS. 7 to 12, and brightness of light emitted from the optical sheets was measured as a viewing angle was continuously changed. Specific values concerning the optical sheets according to Test Examples are shown in Table 1. The items shown in Table 1 are as follows:

Substrate layer: material (PC means polycarbonate), thickness

Light absorbing part: pitch (Pk in FIG. 10)
 upper base width (Wa in FIG. 10)
 lower base width (Wb in FIG. 10)
 thickness (Dk in FIG. 10)

Thickness of optical function layer

Refractive index: light transmission part
 light absorption part

Angle of inclination at interface: upper side (θ1 in FIG. 11)
 lower side (θ2 in FIG. 11)

Optical diffuse reflectance: substrate side (when the substrate layer was the light input side)
 : light diffuser layer side (when the light diffuser layer was on the light input side)

[Measurement of Optical Diffuse Reflectance]

Figure 13A:
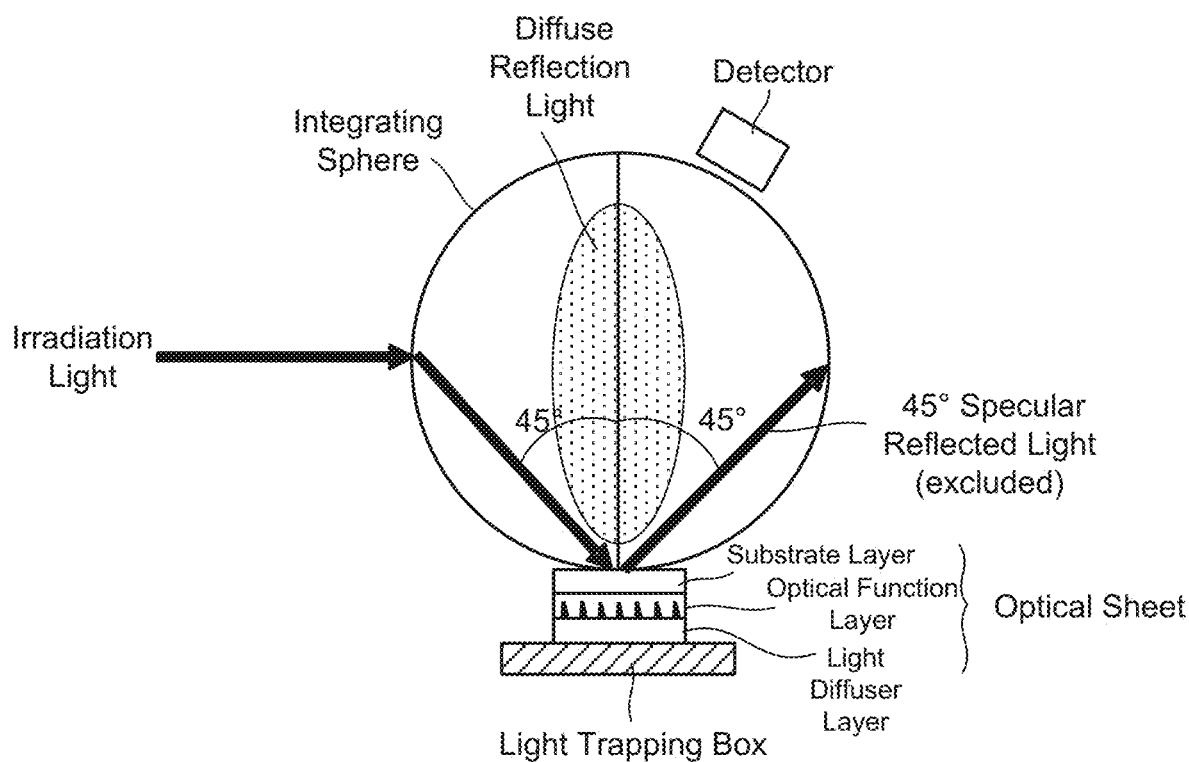
FIGS. 13A and 13B are explanatory views of ways of measuring diffuse reflectance.
Figure 13B:
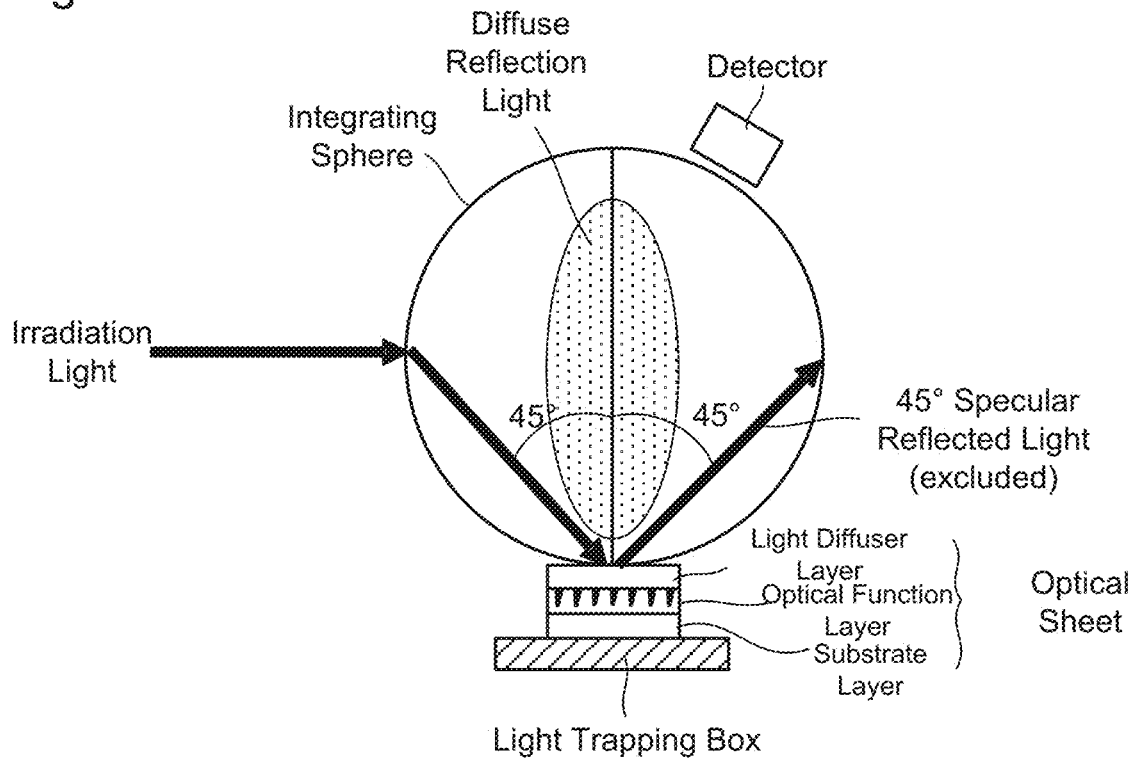

Here, optical diffuse reflectance was defined by omnidirectional optical diffuse reflectance that was obtained by excluding reflectance of specular reflected light from the total reflectance. Specifically, optical diffuse reflectance was measured using a haze meter (HR-100 by Murakami Color Research Laboratory, measurement condition: reflection) as shown in FIGS. 13A and 13B, which is described in more detail as follows:

A layer to be measured (substrate layer or light diffuser layer) of the optical sheet faced the light input side (integrating sphere side), and a light trapping box that absorbed reaching light was arranged on the opposite side thereof. That is, FIG. 13A shows measurement of the diffuse reflectance on the substrate layer side, and FIG. 13B shows measurement of the diffuse reflectance on the diffuser layer side. A standard white board (barium sulfate, reflectance: 98.3%) was arranged at the position of the light trapping box before measurement, to carry out an initial setting, and thereafter the light trapping box was arranged instead of the standard white board, to conduct measurement.

Irradiation light (light source D65) inclining 45° from the normal line of the optical sheet in a direction of aligning the light transmission parts and light absorbing parts by turns was irradiated to the optical sheet arranged as described above.

In the irradiation light, 45° specular reflected light was excluded from the light reflected by the optical sheet, to obtain omnidirectional light in the integrating sphere at this time by a detector. This was diffuse reflection light.

The proportion of the omnidirectional light (diffuse reflection light) to the irradiation light represented in terms of percentage was "optical diffuse reflectance".

[Measurement of Relative Brightness]

Following the image source unit 210, the light diffuser layer of the optical sheet according to each of Test Examples A1 to A9 as described above was directed to the light input side, and a reference light diffuser plate was further arranged on the light input side of the optical sheet, to measure brightness of light transmitted through the reference diffuser plate and the optical sheet, at each viewing angle, using a brightness goniophotometer (GP-500 by Murakami Color Research Laboratory). This measured brightness was a relative brightness ratio when brightness of light that was transmitted only through the reference diffuser plate at each viewing angle was regarded as 100%. Here, the reference light diffuser plate was a light diffuser plate whose front gain was 0.45, and gain at ±60° was 0.40.

TABLE 1

| | Substrate Layer | | Light Absorbing Part | | | Thickness of Optical Function Layer (μm) | Refractive Index | | Angle of Inclination at Interface (°) | | Diffuse Reflectance (%) | |
|---|---|---|---|---|---|---|---|---|---|---|---|---|
| | Material | Thickness (μm) | Pitch (μm) | Upper Base Width (μm) | Lower Base Width (μm) | Thickness (μm) | | Light Transmission Part | Light Absorbing Part | Upper Side | Lower Side | Substrate Side | Light Diffuser Layer Side |
| Test Ex. A1 | PC | 130 | 47 | 4 | 22 | 120 | 145 | 1.56 | 1.49 | 4 | 5 | 3.2 | 3.8 |
| Test Ex. A2 | PC | 130 | 39 | 4 | 10 | 102 | 127 | 1.56 | 1.49 | 0 | 3 | 3.2 | 3.8 |
| Test Ex. A3 | PC | 130 | 47 | 4 | 22 | 120 | 145 | 1.56 | 1.49 | 4 | 5 | 3.2 | 0.8 |
| Test Ex. A4 | PC | 130 | 39 | 4 | 10 | 102 | 127 | 1.56 | 1.49 | 0 | 3 | 3.2 | 0.8 |
| Test Ex. A5 | PC | 130 | 39 | 4 | 10 | 102 | 127 | 1.56 | 1.49 | 0 | 3 | 0.9 | 3.8 |
| Test Ex. A6 | PC | 130 | 39 | 4 | 10 | 102 | 127 | 1.56 | 1.48 | 0 | 3 | 3.2 | 3.8 |
| Test Ex. A7 | PC | 130 | 39 | 4 | 10 | 102 | 127 | 1.60 | 1.49 | 0 | 3 | 3.2 | 3.8 |
| Test Ex. A8 | PC | 130 | 47 | 4 | 22 | 120 | 145 | 1.56 | 1.56 | 4 | 5 | 3.2 | 3.8 |
| Test Ex. A9 | PC | 130 | 39 | 4 | 10 | 102 | 127 | 1.56 | 1.56 | 0 | 3 | 3.2 | 3.8 |

[Result 1]

Figure 14:
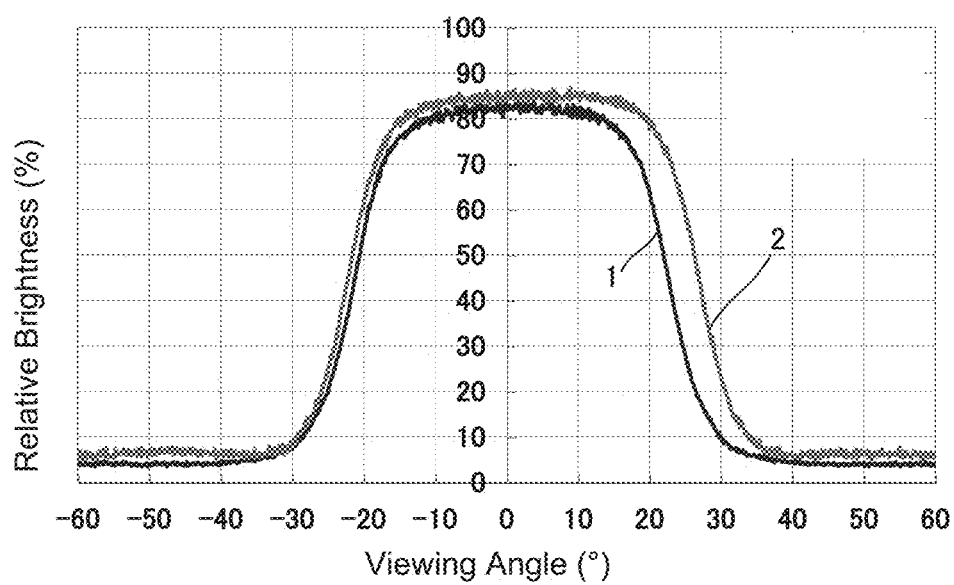
FIG. 14 is a graph showing results of measuring brightness of light at viewing angles in a vertical direction in Test Examples A1 and A2.

FIG. 14 shows results of relative brightness when viewing angles at 0° in the horizontal direction were changed in vertical direction in the case of the optical sheets in Test Examples A1 and A2. The vertical axis of FIG. 14 shows relative brightness (%), and the horizontal axis thereof shows a viewing angle (O) in the vertical direction. Here, the viewing angle at 0° means front relative brightness, a viewing angle more than 0° means a viewing angle upward in the vertical direction, and a viewing angle less than 0° means a viewing angle downward in the vertical direction.

The line 1 in FIG. 14 represents results of Test Example A1, and the line 2 therein represents results of Test Example A2.

In Test Example A1, relative brightness was high when a viewing angle was between −10° and +10°, and rapidly dropped as the viewing angle changed from −10° to −30°. On the other hand, relative brightness while the viewing angle changed from +10° to +30° mildly decreased compared to the case where the viewing angle changed from −10° to −30°. From these results, it can be found that a range of brightness upward in the vertical direction is wider than that downward in the vertical direction. That is, the viewing angle upward is wider than that downward.

As is clear from the results of Test Example A2, the viewing angle upward in the vertical direction with the optical sheet according to Test Example A2 was much wider than that according to Test Example A1.

[Result 2]

Table 2 shows the results of the relative brightness ratios of the optical sheets according to Test Examples A1 to A9 at the viewing angle of 20° upward in the vertical direction and 0° in the horizontal direction, and that of 0° in the vertical direction and 40° in the horizontal direction. Visibility in a driver's view was also evaluated from these results.

"Relative brightness ratios" are values representing relative brightness at the above described viewing angles when relative brightness at 0° in the vertical direction and 0° in the horizontal direction (that is, at the front) is regarded as 100%. Relative brightness is as described above.

On the other hand, visibility in a driver's view was evaluated as follows:

The case where all the relative brightness at 20° upward in the vertical direction and 0° in the horizontal direction, and relative brightness at 0° in the vertical direction and 40° in the horizontal direction were no less than 90% is represented by "excellent", and the case where all of them were no less than 70% is represented by "good".

In contrast, the case where at least one of the relative brightness at 20° upward in the vertical direction and 0° in the horizontal direction, and relative brightness at 0° in the vertical direction and 40° in the horizontal direction was under 70% is represented by "bad".

TABLE 2

|  | Relative Brightness Ratio (%) | | |
| --- | --- | --- | --- |
|  | 20° upward in Vertical Direction 0° in Horizontal Direction | 0° in Vertical Direction 40° in Horizontal Direction | Visibility in Driver's View |
| Test Ex. A1 | 75.8 | 97.5 | good |
| Test Ex. A2 | 93.1 | 97.9 | excellent |
| Test Ex. A3 | 81.5 | 98.8 | good |
| Test Ex. A4 | 94.6 | 98.0 | excellent |
| Test Ex. A5 | 93.7 | 98.0 | excellent |
| Test Ex. A6 | 96.0 | 98.2 | excellent |
| Test Ex. A7 | 97.2 | 99.0 | excellent |
| Test Ex. A8 | 44.7 | 97.1 | bad |
| Test Ex. A9 | 49.5 | 94.6 | bad |

As seen from Table 2, visibility in a driver's view was good in Test Examples A1 and A3. Visibility in a driver's view was excellent in Test Examples A2 and A4 to A7.

In contrast, the optical sheets according to Test Examples A8 and A9 had a low relative brightness ratio at 20° upward in the vertical direction and 0° in the horizontal direction, and visibility in a driver's view was bad. It can be considered that this was because total reflection did not occur to light reaching the interfaces between the light transmission parts and light absorbing parts, but this light was absorbed since the difference between the light transmission parts and light absorbing parts in refractive index was 0.

Test Examples B

Test Examples B1 to B9

As Test Examples B, optical sheets according to Test Examples B1 to B9 where shapes of the cross sections of the light transmission parts and the light absorption parts were varied were made, to check efficiency of light utilization.

Test Example B1

Figure 15:
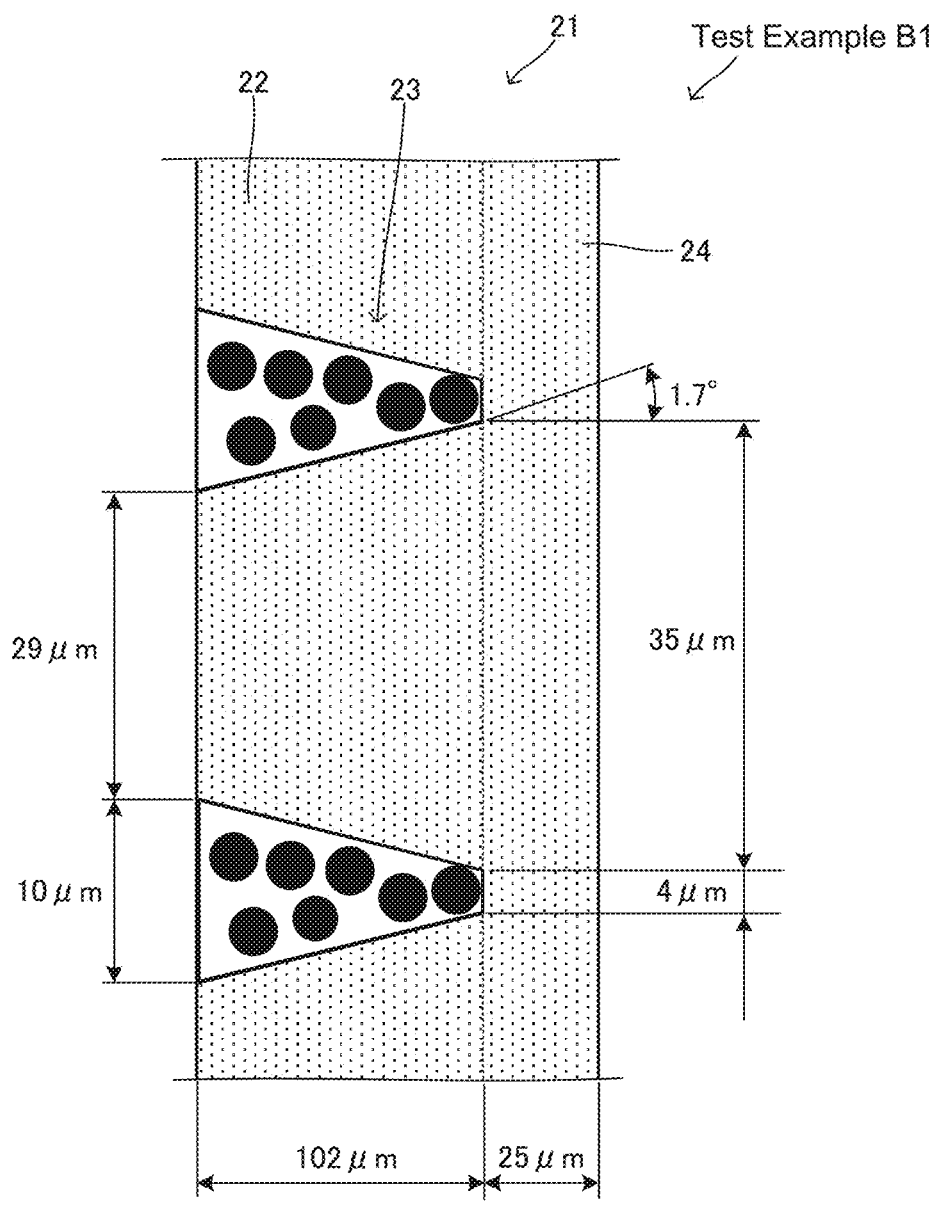
FIG. 15 is an explanatory view of a structure of an optical function layer in Test Example B1.

In Test Example B1, an optical sheet that included an optical function layer having a shape of the cross section shown in FIG. 15 was made. This optical sheet was formed of the optical function layer and a substrate layer, and was made by the above described method. See the following for more details:

Polycarbonate resin of 130 μm in thickness was used for the substrate layer;

UV-curable urethane acrylate of 1.56 in refractive index was used for the light transmission part. The cross section of the light transmission part was an isosceles trapezoid of 29 μm in upper base, 35 μm in lower base and 102 μm in height;

UV-curable urethane acrylate of 1.49 in refractive index was used for the binder of the light absorption part. In the binder, 25 mass % of acrylic beads containing carbon black was included. The cross section of the light absorption part was an isosceles trapezoid of 4 μm in upper base, 10 μm in lower base and 102 μm in height; and The linking part was 25 μm in thickness (Tk in FIG. 3).

A 6.5-inch liquid crystal display (LQ65T5GG03, manufactured by Sharp Corporation) was equipped with the optical sheet as the above, to be a liquid crystal display. More specifically, the optical sheet was arranged in the light output surface side of a surface light source device that consisted of a light guide plate in a side surface of which a light emission source was arranged, a prism sheet, a light diffuser film and a reflective polarizing plate; and a liquid crystal panel was arranged in the light output surface side of the optical sheet.

Test Example B2

Figure 16:
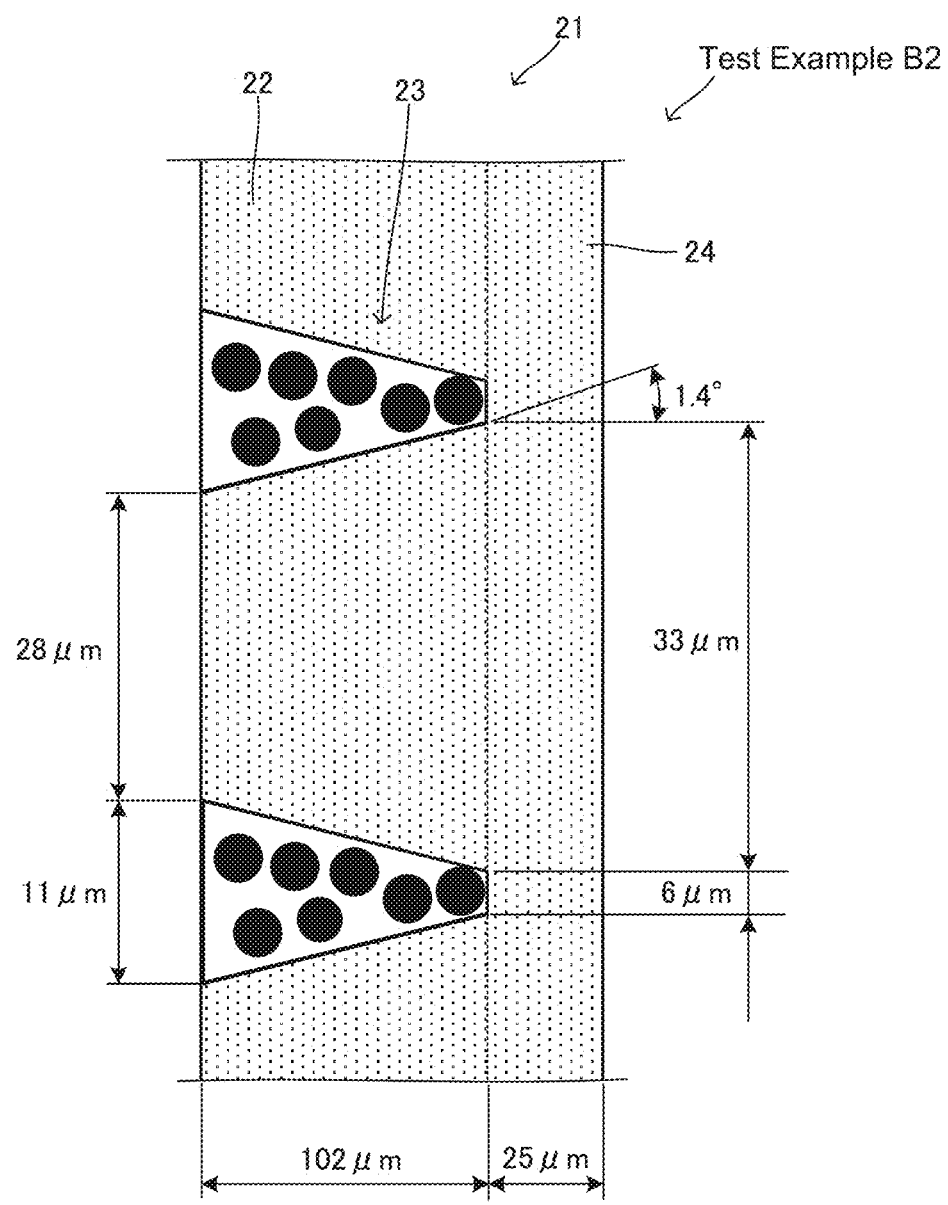
FIG. 16 is an explanatory view of a structure of an optical function layer in Test Example B2.

Test Example B2 was the same as Test Example B1 except that shapes of the cross sections of the light transmission parts and the light absorption parts were changed as FIG. 16.

Test Example B3

Figure 17:
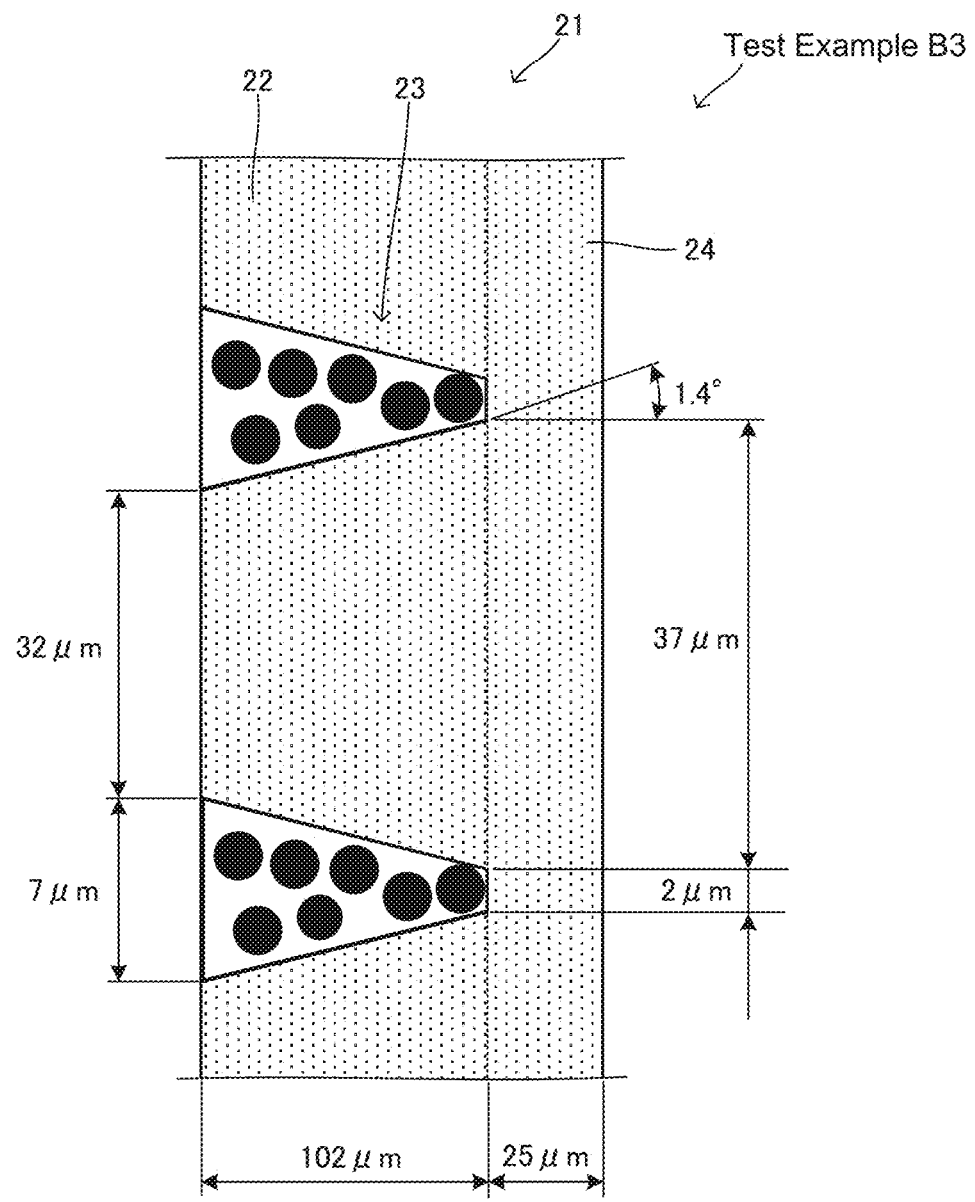
FIG. 17 is an explanatory view of a structure of an optical function layer in Test Example B3.

Test Example B3 was the same as Test Example B1 except that shapes of the cross sections of the light transmission parts and the light absorption parts were changed as FIG. 17.

Test Example B4

Figure 18:
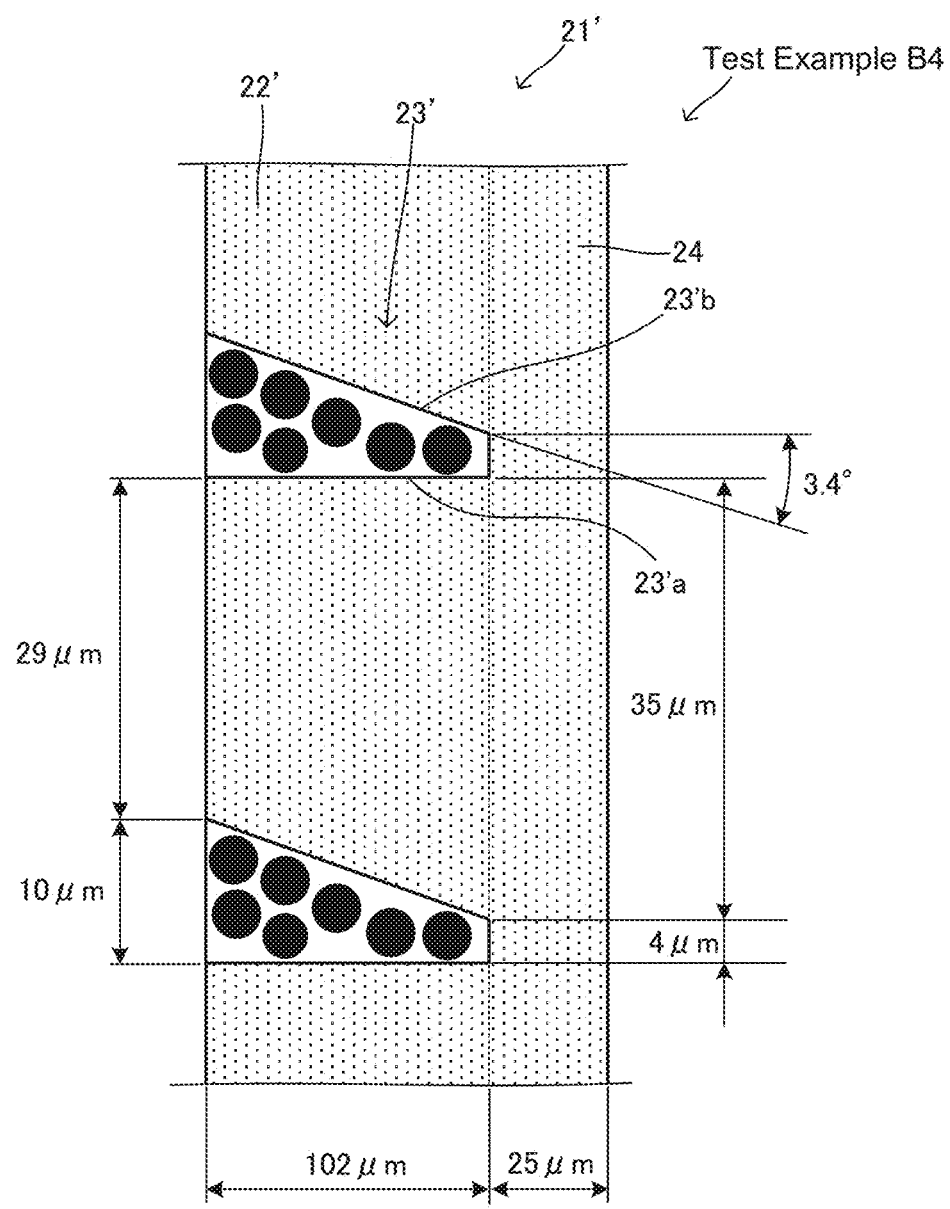
FIG. 18 is an explanatory view of a structure of an optical function layer in Test Example B4.

The example shown in FIG. 6A was followed by Test Example B4. Test Example B4 was such an example that angles of inclination of two leg parts of the light transmission part and the light absorption part were different. Specifically, shapes of the cross sections of the light transmission parts and the light absorption parts were changed as FIG. 18. Here, an angle of inclination of the leg part 23'a was 0° (that is, the leg part 23'a was parallel to the normal line to the layer surface of the optical sheet). Other details were same as Test Example B1.

Test Example B5

Figure 19:
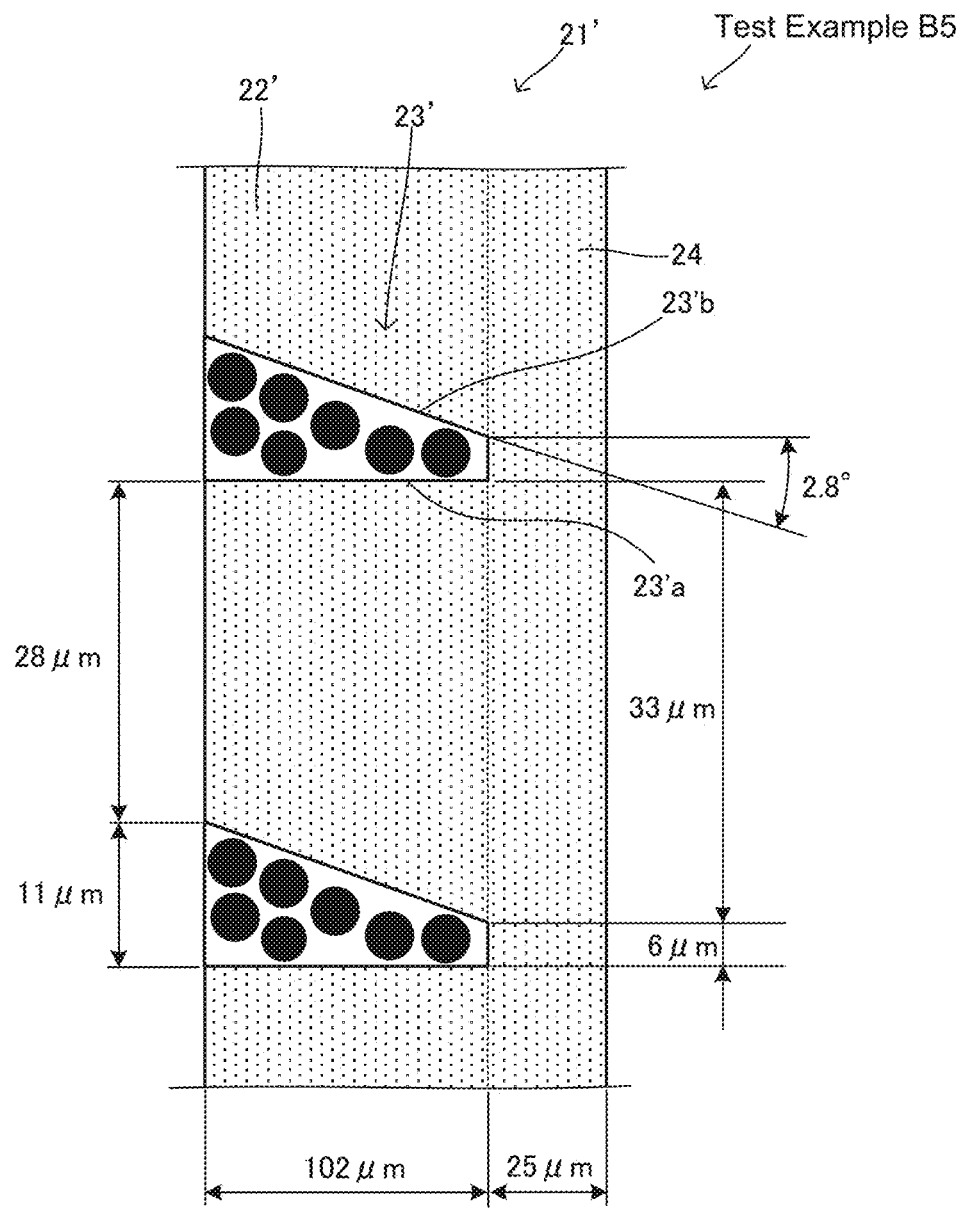
FIG. 19 is an explanatory view of a structure of an optical function layer in Test Example B5.

Test Example B5 was the same as Test Example B4 except that shapes of the cross sections of the light transmission parts and the light absorption parts were changed as FIG. 19.

Test Example B6

Figure 20:
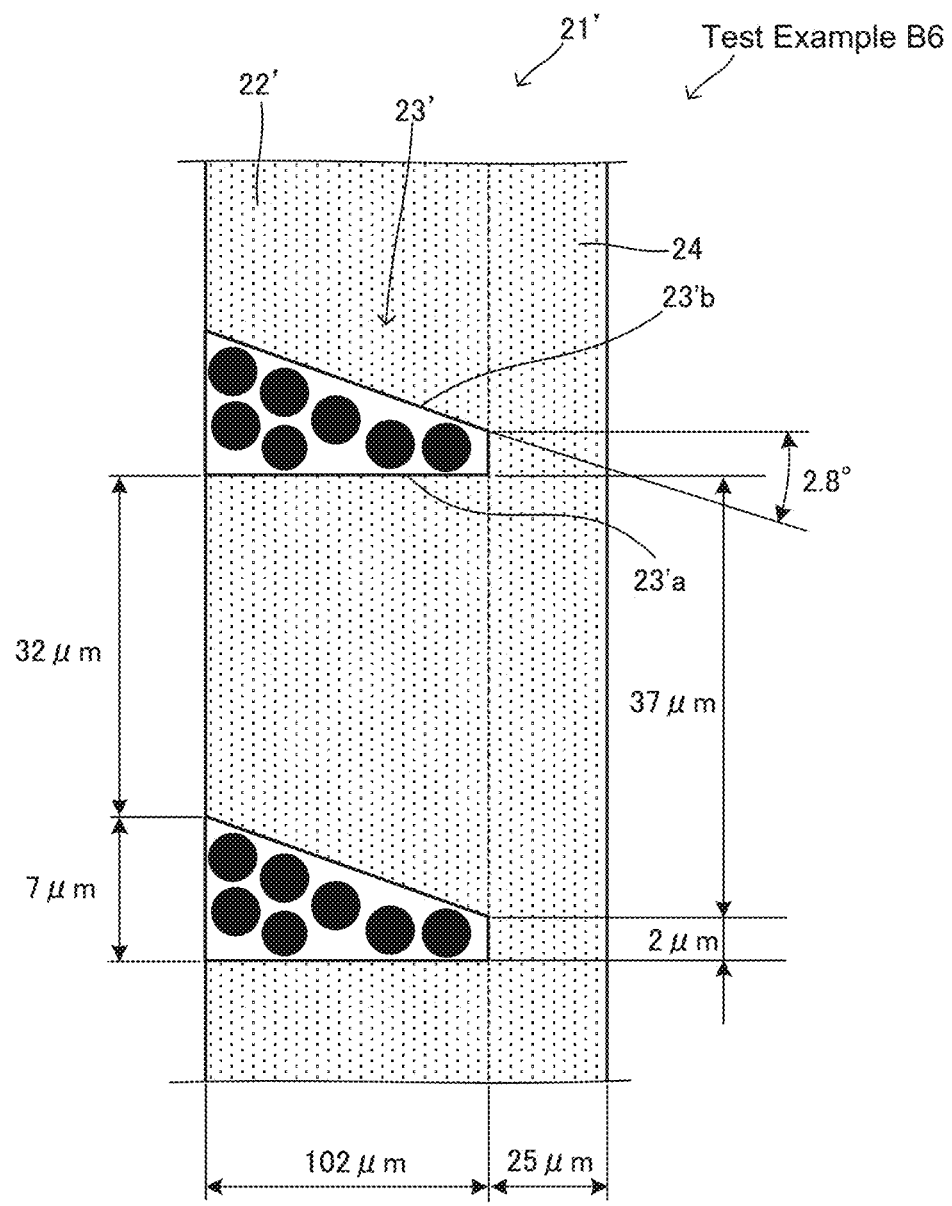
FIG. 20 is an explanatory view of a structure of an optical function layer in Test Example B6.

Test Example B6 was the same as Test Example B4 except that shapes of the cross sections of the light transmission parts and the light absorption parts were changed as FIG. 20.

Test Example B7

Figure 21:
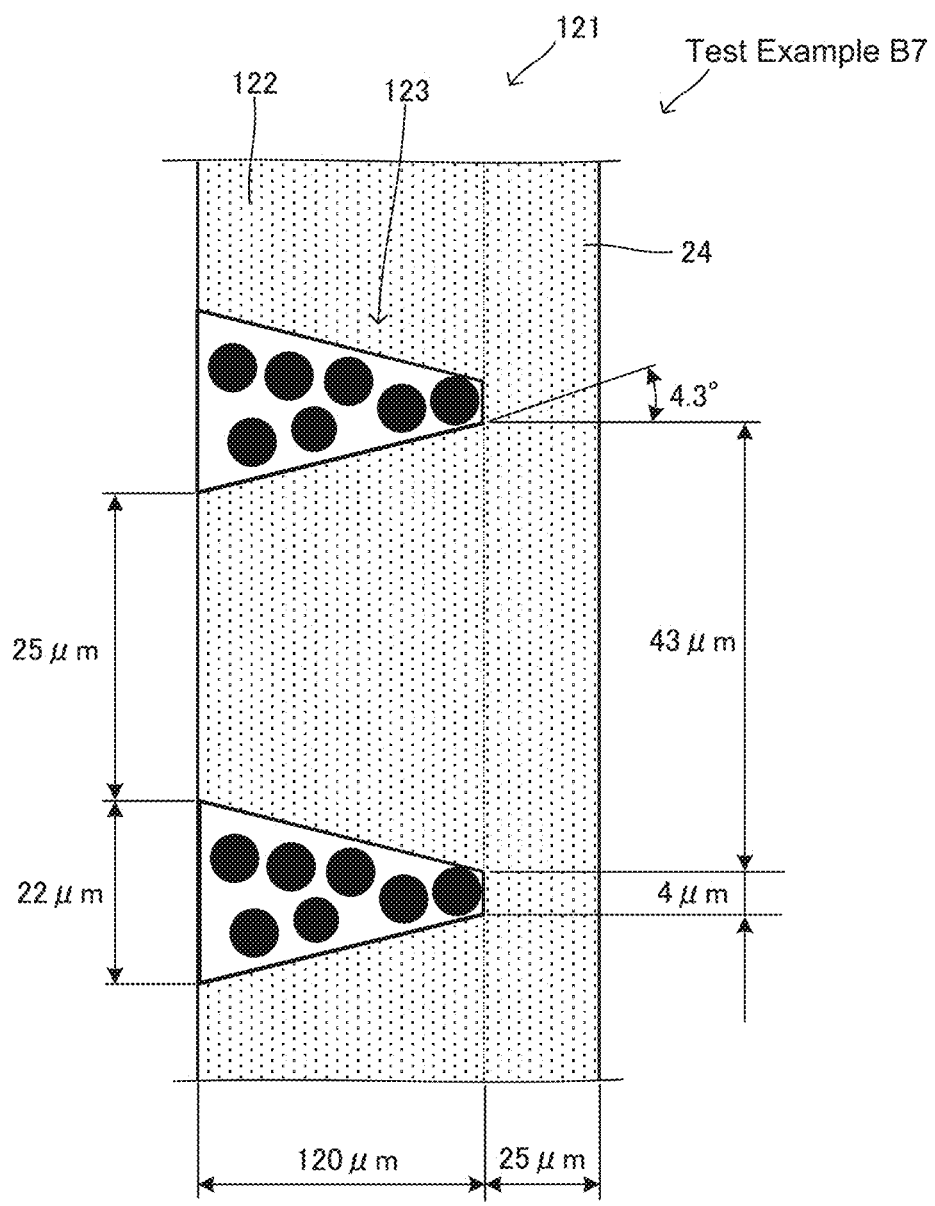
FIG. 21 is an explanatory view of a structure of an optical function layer in Test Example B7.

Test Example B7 was the same as Test Example B1 except that shapes of the cross sections of the light transmission parts and the light absorption parts were changed as FIG. 21. Here, some signs used in FIGS. 21 to 23 represent the optical function layer 121, the light transmission parts 122 and the light absorption parts 123.

Test Example B8

Figure 22:
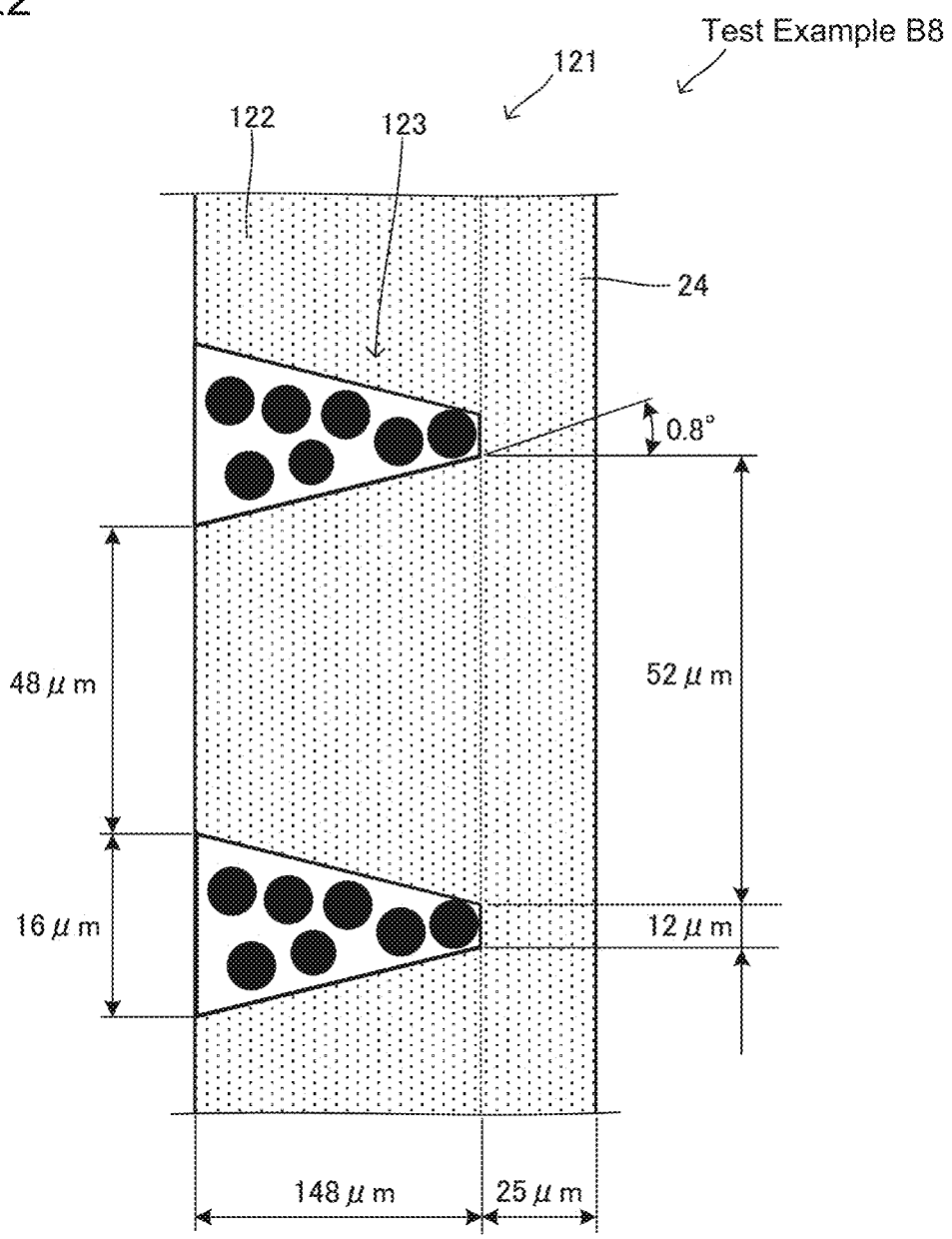
FIG. 22 is an explanatory view of a structure of an optical function layer in Test Example B8.
Figure 23:
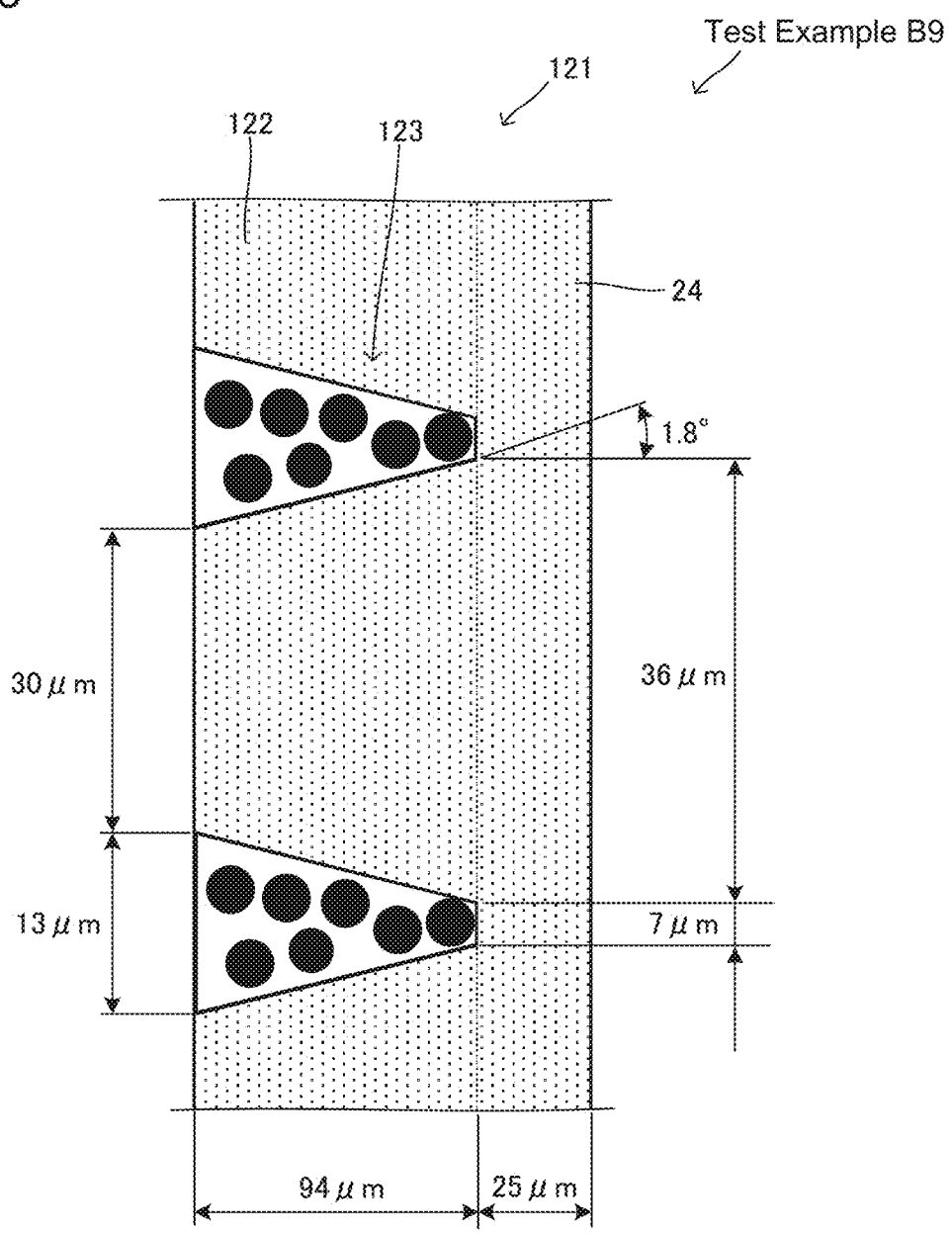
FIG. 23 is an explanatory view of a structure of an optical function layer in Test Example B9.

Test Example B8 was the same as Test Example B1 except that shapes of the cross sections of the light transmission parts and the light absorption parts were changed as FIG. 22.

Test Example B9

Test Example B9 was the same as Test Example B1 except that shapes of the cross sections of the light transmission parts and the light absorption parts were changed as FIG. 23.

Brightness of each of the above made liquid crystal displays according to Test Examples B1 to B9 was measured in the normal line direction of the optical sheet, assuming that the normal line direction was 0°, and at every 10° of inclination from the normal line to ±80°, with EZContrast (manufactured by ELDIM). Then, their integrated values of brightness were obtained. Thus, it could be said that a larger integrated value of brightness indicated more light emission, which was accompanied by high efficiency of light utilization.

On the other hand, as to a light blocking effect, brightness was measured in the normal line direction of the optical sheet, assuming that the normal line direction was 0°, and at every 10° of inclination from the normal line to ±80°, with EZContrast (manufactured by ELDIM). Then, brightness at 45° (the mean of 40° and 50° in brightness) was measured and represented in percentage terms assuming that the front brightness was 100%. A case where a value represented in percentage terms was no more than 100% was regarded as a good light blocking effect.

Table 3 shows characteristic shapes of the light transmission parts and the light absorption parts other than the above description and the measurement results.

"Proportion of Cross-sectional Area of Light Transmission Part (%)" represents a percentage of the cross-sectional area of the light transmission part 22 or 122 in the total cross-sectional area of one adjacent light transmission part 22 or 122 and light absorption part 23 or 123, respectively. That is, this percentage can be calculated by "an area of one light transmission part/(an area of one light transmission part+an area of one light absorption part) in each cross section shown in FIGS. 15 to 23.

"Proportion of Opening (%)" represents a proportion of an area of the light transmission part 22 or 122 per pitch in a surface side of the optical function layer where incident light comes (in these examples, the shorter upper base side of the light transmission part 22 or 122). That is, this proportion can be calculated by "a length of the upper base of one light transmission part/(a length of the upper base of one light transmission part+a length of the lower base of one light absorption part)" in each cross section shown in FIGS. 15 to 23.

"Integrated Brightness" and "Light Blocking Effect" are as described above.

TABLE 3

| | Proportion of Cross-sectional Area of Light Transmission Part (%) | Proportion of Opening (%) | Integrated Brightness (cd/m$^2$) | Light Blocking Effect |
|---|---|---|---|---|
| Test Ex. B1 | 82.1 | 74.4 | 2841 | 6.7% |
| Test Ex. B2 | 78.2 | 71.8 | 2610 | 5.2% |
| Test Ex. B3 | 88.5 | 82.1 | 3200 | 9.8% |
| Test Ex. B4 | 82.1 | 74.4 | 2841 | 6.7% |
| Test Ex. B5 | 78.2 | 71.8 | 2610 | 5.2% |
| Test Ex. B6 | 88.5 | 82.1 | 3200 | 9.8% |
| Test Ex. B7 | 72.3 | 53.2 | 2450 | 4.7% |
| Test Ex. B8 | 78.1 | 75.0 | 2587 | 4.5% |
| Test Ex. B9 | 76.7 | 69.8 | 2530 | 7.0% |

As can be seen from Table 3, the integrated brightness of Test Examples B1 to B6 was larger and the efficiency of light utilization thereof was higher than those of Test Examples B7 to B9. Here, as can be seen from the comparison between Test Examples B1 and B8 for example, even if the proportions of openings were approximately same, integrated brightness largely differed. All Examples had no more than 10% of good light blocking effects.

Test Examples B10 to B17

Liquid crystal displays were made with optical sheets according to Test Examples B10 to B17 that optical diffuse reflectance in the light input sides and optical diffuse reflectance in the light output sides varied, to check interference fringes, scintillation (glares) and light blocking effects.

An optical sheet that included an optical function layer having light transmission parts and light absorption parts whose shapes of the cross sections were as shown in FIG. 4 was made. More particularly, this optical sheet was formed of the optical function layer, a substrate layer, and layers having micro-roughness. See the following for further details:

Matte polycarbonate resin of 130 μm in thickness was used for the substrate layer. That is, a micro-roughness surface formed on a mold was copied on a surface of the substrate layer which was in the opposite side to the optical function layer, to form micro-roughness (matte surface);

UV-curable urethane acrylate of 1.56 in refractive index was used for the light transmission part. The cross section of the light transmission part was an isosceles trapezoid of 29 µm in upper base, 35 µm in lower base and 102 µm in height (Dk in FIG. 3);

UV-curable urethane acrylate of 1.49 in refractive index was used for the binder of the light absorption part. In the binder, 25 mass % of acrylic beads containing carbon black was included. The cross section of the light absorption part was an isosceles trapezoid of 4 µm in upper base, 10 µm in lower base and 102 µm in height (Dk in FIG. 3);

The linking part was 25 µm in thickness (Tk in FIG. 3); and

In addition, a layer having micro-roughness (matte) was formed of the materials same as the light transmission part, on a surface of the optical function layer which was in the opposite side to the substrate layer, with a mold having a micro-roughness surface. Whereby, the optical sheet whose thickness was 280 µm, which was total thickness of the substrate layer, the optical function layer and the layers having micro-roughness, was obtained.

Optical diffuse reflectance in the light input side and optical diffuse reflectance in the light output side were adjusted according to the substrate layers, and change in degree of micro-roughness (surface roughness) provided on the surface of any mold for forming the layers having micro-roughness, to obtain the optical sheets of Test Examples B10 to B17. Micro-roughness provided on the surface of the molds was formed by copper-plating on the surface of the molds and blasting process on the copper plating with glass beads. Its roughness was adjusted according to diameters of the beads for the blasting process and pressure for the blasting process.

The optical diffuse reflectance in the light input side and the optical diffuse reflectance in the light output side of the optical sheet of each of Test Examples B10 to B17 as described above were measured as described above. The measurement results will be shown in Table 4 later along with their evaluation results.

Liquid crystal displays of 6.5-inch (LQ65T5GG03, manufactured by Sharp Corporation) were equipped with the optical sheets as the above, to be liquid crystal displays. More specifically, an optical sheet was arranged in the light output surface side of a surface light source device that consisted of a light guide plate in a side surface of which a light emission source was arranged, a prism sheet, a light diffuser film and a reflective polarizing plate; and a liquid crystal panel was arranged in the light output surface side of the optical sheet.

A light blocking effect, occurrence of interference fringes and scintillation (glare) of each of the above made liquid crystal displays according to Test Examples B10 to B17 were evaluated visually.

As to "Light Blocking Effect", brightness was measured in the normal line direction of the optical sheet, assuming that the normal line direction was 0°, and at every 10° of inclination from the normal line to ±80°, with EZContrast (manufactured by ELDIM). Then, the case where the proportion of brightness at 45° (the mean of 40° and 50° in brightness) in the front brightness was no more than 7% was regarded as a good light blocking effect, and is indicated by o (open circle). The case where this proportion was more than 7% is indicated by x (cross), which means bad light blocking effect.

It was checked whether "Interference Fringe" and "Scintillation" occurred visually upon turning off the liquid crystal display. A case where no fringe and scintillation occurred is indicated by an open circle, and a case where fringe or scintillation occurred is indicated by a cross.

The results are shown in Table 4.

TABLE 4

|  | Optical Diffuse Reflectance on Light Output Side (%) | Optical Diffuse Reflectance on Light Input Side (%) | Light Blocking Effect | Interference Fringe | Scintillation |
| --- | --- | --- | --- | --- | --- |
| Test Ex. B10 | 3.2 | 2.9 | ○ | ○ | ○ |
| Test Ex. B11 | 3.2 | 3.8 | ○ | ○ | ○ |
| Test Ex. B12 | 1.9 | 2.5 | ○ | ○ | ○ |
| Test Ex. B13 | 3.5 | 5.0 | ○ | ○ | ○ |
| Test Ex. B14 | 3.5 | 2.5 | ○ | ○ | ○ |
| Test Ex. B15 | 1.9 | 5.0 | ○ | ○ | ○ |
| Test Ex. B16 | 1.5 | 1.9 | ○ | X | X |
| Test Ex. B17 | 3.8 | 3.2 | X | ○ | ○ |

As is seen from Table 4, in a case where the optical diffuse reflectance in the light output surface side of the optical sheet was 1.9% to 3.5%, all of a light blocking effect, interference fringe and scintillation could be "good".

Test Examples C

Figure 24:
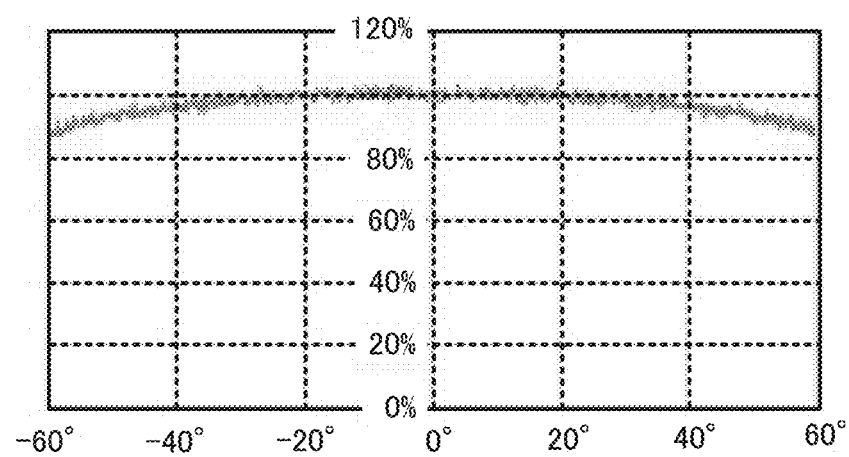
FIG. 24 shows characteristics of a reference diffuser plate used in Test Example C.

In Test Examples C, optical sheets according to Test Examples C1 to C12 were respectively made; and following the image source unit 210, a light diffuser layer of each of the optical sheets was directed to the light input side, and a reference light diffuser plate was further arranged on the light input side of the optical sheet, to measure brightness of light transmitted through the reference diffuser plate and the optical sheet at each viewing angle, using a brightness goniophotometer (GP-500 by Murakami Color Research Laboratory). FIG. 24 shows characteristics of the reference diffuser plate. In FIG. 24, the horizontal axis shows a viewing angle, which is 0° at the front; and the vertical axis shows relative brightness, which is 100% at the front (viewing angle is 0°).

Test Examples C and C2

Table 5 shows the structure of each layer in Test Examples C1 and C2, wherein values of the same items as in Table 1 are shown concerning the optical function layer.

TABLE 5

|  | Light Diffuser Layer | | Ultraviolet Curable Resin Layer | Optical Function Layer Light Absorbing Part | | | | |
|---|---|---|---|---|---|---|---|---|
|  |  |  |  |  | Upper Base | | Lower Base | |
|  | Material | Thickness (μm) | Haze | Thickness (μm) | Pitch (μm) | Width (μm) | Width (μm) | Thickness (μm) | Thickness (μm) |
| Test Ex. C1 | PC | 25 | 30 | 25 | 47 | 4 | 22 | 120 | 145 |
| Test Ex. C2 | PC | 25 | 30 | None | 39 | 4 | 10 | 102 | 127 |

| | Optical Function Layer | | | | Substrate Layer | | |
|---|---|---|---|---|---|---|---|
|  | Refractive Index | | Angle of Inclination at Interface (°) | | | | |
|  | Light Transmission Part | Light Absorbing Part | Upper Side | Lower Side | Material | Thickness (μm) | Haze |
| Test Ex. C1 | 1.56 | 1.49 | 4.5 | 4.5 | PC | 130 | 20 |
| Test Ex. C2 | 1.56 | 1.49 | 3.0 | 0.0 | PC | 130 | 20 |

Test Example C1

In Test Example C1, the light diffuser layer, the ultraviolet curable resin layer, the optical function layer, and the substrate layer were laminated in order from the light input side (reference diffuser plate side).

In Test Example C2, the light diffuser layer having a matte surface, the optical function layer and the substrate layer were laminated in order from the light input side (reference diffuser plate side).

The results are shown in Table 6. The relative brightness ratio and the visibility in a driver's view were obtained in the same manner as in Test Examples A. The brightness of light transmitted only through the reference diffuser plate at each viewing angle was defined as 100%, to obtain the relative brightness ratio. The results in Table 6 were evaluated by the same standards as those for the results in Table 2.

TABLE 6

| | Relative Brightness Ratio (%) | | |
|---|---|---|---|
| | 20° upward in Vertical Direction 0° in Horizontal Direction | 0° in Vertical Direction 40° in Horizontal Direction | Visibility in Driver's View |
| Test Ex. C1 | 64.3 | 79 | bad |
| Test Ex. C2 | 80 | 79.8 | good |

Test Examples C3 to C8

Test Examples C3 to C8 were examples of arranging a reflective polarizing plate (DBEF, D2-400 from 3M Japan Limited) between a light diffuser layer and a reference diffuser plate. The structure in each Example is shown in Table 7.

TABLE 7

| | Reflective Polarizing Plate | Light Diffuser Layer | | | Ultraviolet Curable Resin Layer | Optical Function Layer | | | |
|---|---|---|---|---|---|---|---|---|---|
| | | | | | | | Light Absorbing Part | | |
| | Thickness (μm) | Material | Thickness (μm) | Haze | Thickness (μm) | Pitch (μm) | Upper Base Width (μm) | Lower Base Width (μm) | Thickness (μm) |
| Test Ex. C3 | 400 | PC | 25 | 30 | 25 | 60 | 4 | 28 | 150 |
| Test Ex. C4 | 400 | PC | 25 | 30 | 25 | 47 | 4 | 22 | 120 |
| Test Ex. C5 | 400 | PC | 25 | 30 | None | 39 | 4 | 10 | 102 |
| Test Ex. C6 | 400 | PC | 25 | 30 | None | 39 | 4 | 10 | 102 |
| Test Ex. C7 | 400 | PC | 25 | 30 | None | 39 | 4 | 10 | 102 |
| Test Ex. C8 | 400 | PC | 25 | 30 | None | 65 | 12 | 17 | 150 |

| | Optical Function Layer | | | | | Substrate Layer | | | |
|---|---|---|---|---|---|---|---|---|---|
| | | Refractive Index | | Angle of Inclination at Interface (°) | | | | | Haze |
| | Thickness (μm) | Light Transmission Part | Light Absorbing Part | Upper Side | Lower Side | Material | Thickness (μm) | Main Part | Rough Surface |
| Test Ex. C3 | 175 | 1.56 | 1.49 | 4.5 | 4.5 | PC | 130 | 20 | — |
| Test Ex. C4 | 145 | 1.56 | 1.49 | 4.5 | 4.5 | PC | 130 | 20 | — |
| Test Ex. C5 | 127 | 1.56 | 1.49 | 3.0 | 0.0 | PC | 130 | 20 | — |
| Test Ex. C6 | 127 | 1.56 | 1.49 | 3.0 | 0.0 | PC | 130 | 20 | 20 |
| Test Ex. C7 | 127 | 1.56 | 1.49 | 3.0 | 0.0 | PC | 250 | 20 | 20 |
| Test Ex. C8 | 175 | 1.56 | 1.49 | 1.0 | 1.0 | PC | 130 | 20 | — |

Test Example C3

In Test Example C3, the reflective polarizing plate, the light diffuser layer, the ultraviolet curable resin layer, the optical function layer, and the substrate layer were laminated in order from the light input side (reference diffuser plate side).

Test Example C4

In Test Example C4, the reflective polarizing plate, the light diffuser layer, the ultraviolet curable resin layer, the optical function layer and the substrate layer were laminated in order from the light input side (reference diffuser plate side).

Test Example C5

In Test Example C5, the reflective polarizing plate, the light diffuser layer having a rough surface, the optical function layer, and the substrate layer were laminated in order from the light input side (reference diffuser plate side).

Test Example C6

In Test Example C6, the reflective polarizing plate, the light diffuser layer having a rough surface, the optical function layer, and the substrate layer having a rough surface were laminated in order from the light input side (reference diffuser plate side).

Test Example C7

In Test Example C7, the reflective polarizing plate, the light diffuser layer having a rough surface, the optical function layer, and the substrate layer having a rough surface were laminated in order from the light input side (reference diffuser plate side).

Test Example C8

In Test Example C8, the reflective polarizing plate, the light diffuser layer having a rough surface, the optical function layer, and the substrate layer were laminated in order from the light input side (reference diffuser plate side).

Table 8 shows the results of Test Examples C3 to C8. The relative brightness ratio and the visibility in a driver's view were obtained in the same manner as in Test Examples A. The brightness of light transmitted through a laminate of the reference diffuser plate and the reflective polarizing plate at each viewing angle was defined as 100%, to obtain the relative brightness ratio.

Here, the results in Table 8 were evaluated by different standards from those for the foregoing Test Examples since the reflective polarizing plate was used in Test Examples C3 to C8. Specifically, the case where all the "relative brightness at 20° upward in the vertical direction and 0° in the horizontal direction, and relative brightness at 0° in the vertical direction and 40° in the horizontal direction" were no less than 45% is represented by "excellent", and the case where all of them were no less than 35% is represented by "good". In contrast, the case where at least one of the "relative brightness at 20° upward in the vertical direction and 0° in the horizontal direction, and relative brightness at 0° in the vertical direction and 40° in the horizontal direction" was under 35% is represented by "bad".

TABLE 8

| | Relative Brightness Ratio (%) | | |
| --- | --- | --- | --- |
| | 20° upward in Vertical Direction 0° in Horizontal Direction | 0° in Vertical Direction 40° in Horizontal Direction | Visibility in Driver's View |
| Test Ex. C3 | 33.7 | 54.1 | bad |
| Test Ex. C4 | 33.7 | 52.5 | bad |
| Test Ex. C5 | 47.8 | 54.1 | excellent |
| Test Ex. C6 | 48.6 | 54.8 | excellent |
| Test Ex. C7 | 47.8 | 53.3 | excellent |
| Test Ex. C8 | 29.7 | 46.1 | bad |

Test Examples C9 to C12

Test Examples C9 to C12 were examples of arranging no light diffuser layer. The structure in each Example is shown in Table 9.

TABLE 9

| | Reflective Polarizing Plate Thickness (μm) | Ultraviolet Curable Resin Layer Thickness (μm) | Optical Function Layer | | | | | | | | | Substrate Layer | | |
| --- | --- | --- | --- | --- | --- | --- | --- | --- | --- | --- | --- | --- | --- | --- | --- |
| | | | Light Absorbing Part | | | | Refractive Index | | Angle of Inclination at Interface (°) | | | | | |
| | | | Pitch (μm) | Upper Base Width (μm) | Lower Base Width (μm) | Thickness (μm) | Thickness (μm) | Light Transmission Part | Light Absorbing Part | Upper Side | Lower Side | Material | Thickness (μm) | Haze Main Part | Rough Surface |
| Test Ex. C9 | 400 | 25 | 65 | 12 | 17 | 150 | 175 | 1.56 | 1.49 | 1.0 | 1.0 | PC | 100 | 20 | — |
| Test Ex. C10 | 400 | 25 | 43 | 8 | 14 | 96 | 175 | 1.56 | 1.49 | 2.0 | 2.0 | PC | 100 | 20 | — |
| Test Ex. C11 | 400 | 25 | 43 | 8 | 14 | 96 | 121 | 1.56 | 1.49 | 2.0 | 2.0 | PC | 100 | 20 | — |

Test Example C9

In Test Example C9, the reflective polarizing plate, the ultraviolet curable resin layer, the optical function layer, and the substrate layer were laminated in order from the light input side (reference diffuser plate side).

Test Example C10

In Test Example C10, the reflective polarizing plate, the ultraviolet curable resin layer, the optical function layer, and the substrate layer were laminated in order from the light input side (reference diffuser plate side).

Test Example C11

In Test Example C11, the reflective polarizing plate, the ultraviolet curable resin layer, the optical function layer, and the substrate layer were laminated in order from the light input side (reference diffuser plate side).

Test Example C12

In Test Example C12, the reflective polarizing plate, the ultraviolet curable resin layer, the optical function layer, and the substrate layer were laminated in order from the light input side (reference diffuser plate side).

Table 10 shows the results of Test Examples C9 to C12. The relative brightness ratio and the visibility in a driver's view were obtained in the same manner as in Test Examples A. The brightness of light transmitted through a laminate of the reference diffuser plate and the reflective polarizing plate at each viewing angle was defined as 100%, to obtain the relative brightness ratio. The results in Table 10 were judged by the same standards as those for the results in Table 8.

TABLE 10

| | Relative Brightness Ratio (%) | | |
|---|---|---|---|
| | 20° upward in Vertical Direction 0° in Horizontal Direction | 0° in Vertical Direction 40° in Horizontal Direction | Visibility in Driver's View |
| Test Ex. C9 | 25.0 | 52.4 | bad |
| Test Ex. C10 | 25.9 | 51.0 | bad |
| Test Ex. C11 | 37.7 | 51.0 | good |
| Test Ex. C12 | 35.8 | 50.9 | good |

Reference Signs List 1 image display device
5 image source unit
10 image source
11 surface light source device
12 liquid crystal panel
20 optical sheet
21 optical function layer
22 light transmission part
23 light absorption part
25 substrate layer
210 image source unit
215 liquid crystal panel
220 surface light source device
221 light guide plate
225 light source
226 light guide plate diffuser plate
227 prism layer
228 reflective polarizing plate
230 optical sheet
231 substrate layer
232 optical function layer
233 light transmission part
234 light absorbing part
235 light diffuser layer

What is claimed is:

1. An image source unit comprising:
   a surface light source device that includes a light source, and a reflective polarizing plate;
   a liquid crystal panel that is arranged on a light output side of the surface light source device; and
   an optical sheet that is arranged between the surface light source device and the liquid crystal panel,
   the optical sheet comprising:
   a substrate layer;
   an optical function layer that is laminated to one surface of the substrate layer; and
   a light diffuser layer that is arranged on one surface of the optical function layer, the one surface being on an opposite side of another surface of the optical function layer where the substrate layer is arranged across the optical function layer,
   the optical function layer comprising:
   light transmission parts that have predetermined cross sections, extend in a horizontal direction, and are arranged in a plurality of rows at predetermined intervals in a vertical direction; and
   light absorption parts that are formed between adjacent light transmission parts, and have a lower refractive index than that of the light transmission parts,
   wherein an angle formed by interfaces on upper sides of the light absorption parts and a normal line of a surface of the optical sheet is wider than that formed by the interfaces on lower sides of the light absorption parts and the normal line of the surface of the optical sheet, the interfaces being between the light transmission parts and the light absorption parts,
   a relative brightness ratio of light emitted to a laminate of a reference diffuser plate and the reflective polarizing plate at 20° upward in the vertical direction and 0° in the horizontal direction is no less than 35%, and
   a relative brightness ratio of light emitted to the laminate of the reference diffuser plate and the reflective polarizing plate at 40° in the horizontal direction and 0° in the vertical direction is no less than 35%.

2. An image display device comprising:
   a housing; and
   the image source unit according to claim 1 which is arranged inside the housing.

3. The image source unit according to claim 1, wherein
   a cross-sectional area of one of the light transmission parts, to a total cross-sectional area of the one light transmission part and one of the light absorption parts that is adjacent to the one light transmission part is 78.2% to 88.5% on a cross section in a thickness direction of the optical function layer.

4. An image display device comprising:
a housing; and
the image source unit according to claim 1 which is arranged inside the housing.

5. The image source unit according to claim 1, wherein a proportion of opening of the optical function layer is at least 71.8%.

\* \* \* \* \*